United States Patent [19]
Farese et al.

[11] Patent Number: 4,996,685
[45] Date of Patent: Feb. 26, 1991

[54] TECHNIQUE FOR DYNAMICALLY CHANGING AN ISDN CONNECTION DURING A HOST SESSION

[75] Inventors: Thomas R. Farese, Spring Lake; Kenneth E. Ferrere, Howell, both of N.J.

[73] Assignee: Bell Communications Research, Inc., Livingston, N.J.

[21] Appl. No.: 335,542

[22] Filed: Apr. 10, 1989

[51] Int. Cl.$^5$ ............................................... H04J 3/12
[52] U.S. Cl. ................................. 370/58.1; 370/110.1
[58] Field of Search ........................ 370/16, 94.1, 58.1, 370/60, 110-111

[56] References Cited
U.S. PATENT DOCUMENTS

| 4,413,337 | 11/1983 | Dauphin et al. | 370/58 |
|---|---|---|---|
| 4,494,229 | 1/1985 | Jolissaint | 370/58.1 |
| 4,539,676 | 9/1985 | Lucas | 370/60 |
| 4,569,041 | 2/1986 | Takeuchi et al. | 370/60 |
| 4,592,048 | 5/1986 | Beckner et al. | . |
| 4,656,623 | 4/1987 | Dalby, Jr. et al. | . |
| 4,656,624 | 4/1987 | Collins et al. | . |
| 4,679,189 | 7/1987 | Olson et al. | 370/94.1 |
| 4,701,907 | 10/1987 | Collins | 370/63 |
| 4,718,062 | 1/1988 | Andersen | 370/94 |
| 4,731,782 | 3/1988 | Shimizu et al. | 370/60 |
| 4,731,785 | 3/1988 | Ferenc et al. | 370/60 |

Primary Examiner—Douglas W. Olms
Assistant Examiner—Melvin Marcelo
Attorney, Agent, or Firm—James W. Falk

[57] ABSTRACT

A technique is disclosed for use in conjunction with an ISDN communications system for permitting a host computer, that is executing a host session with a user and is connected through the system, to dynamically change an ISDN access path, that connects the user to the host computer and carries the host session therebetween, between a packet switched connection and a circuit switched connection during the occurrence of the session in order to provide the particular connection that is most suited to the communication requirements of a task currently being executed during the session by the host computer. Any such dynamic change of the ISDN access path is invoked by the host computer, does not disrupt the host session and is substantially transparent to the user.

16 Claims, 12 Drawing Sheets

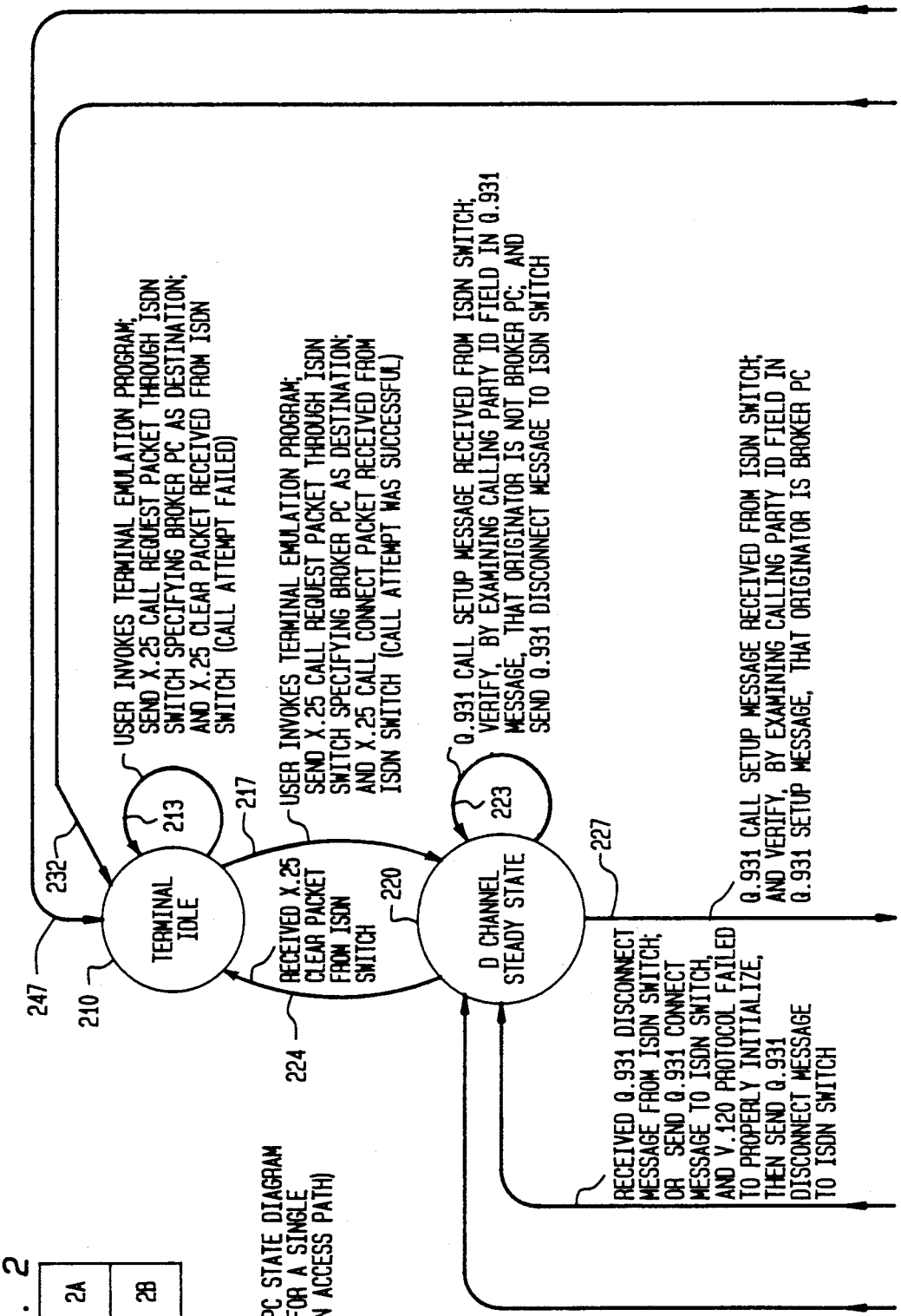

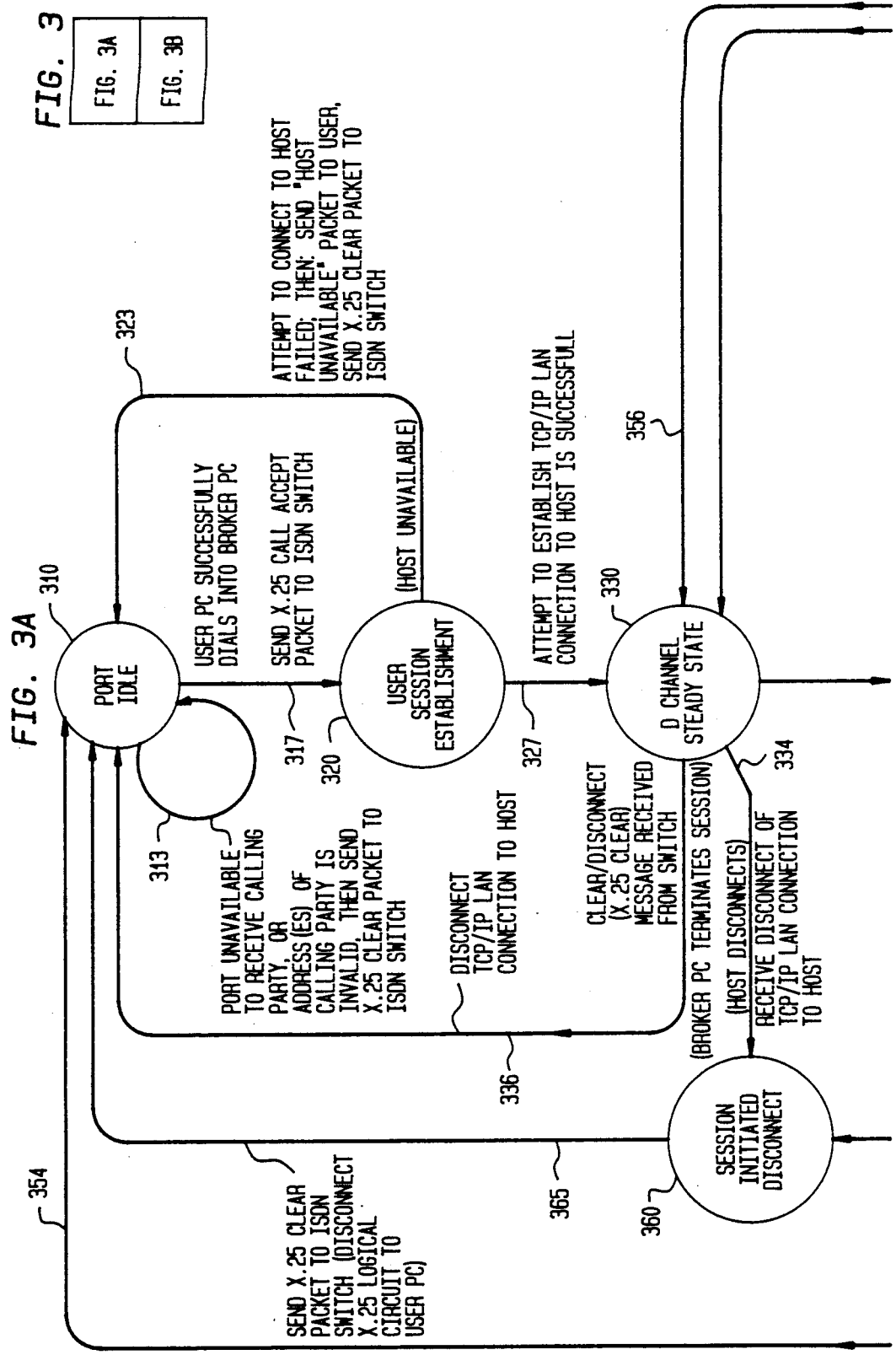

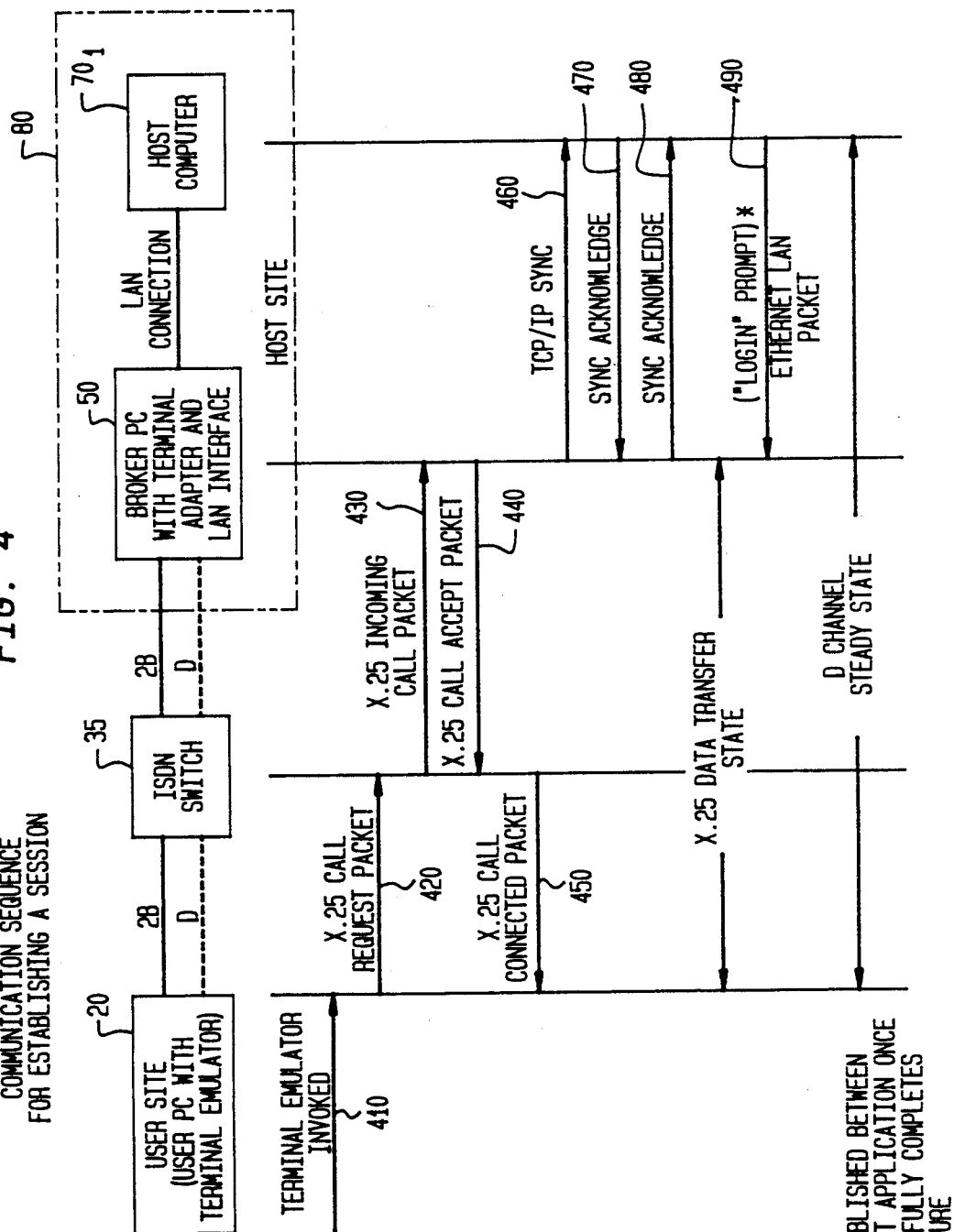

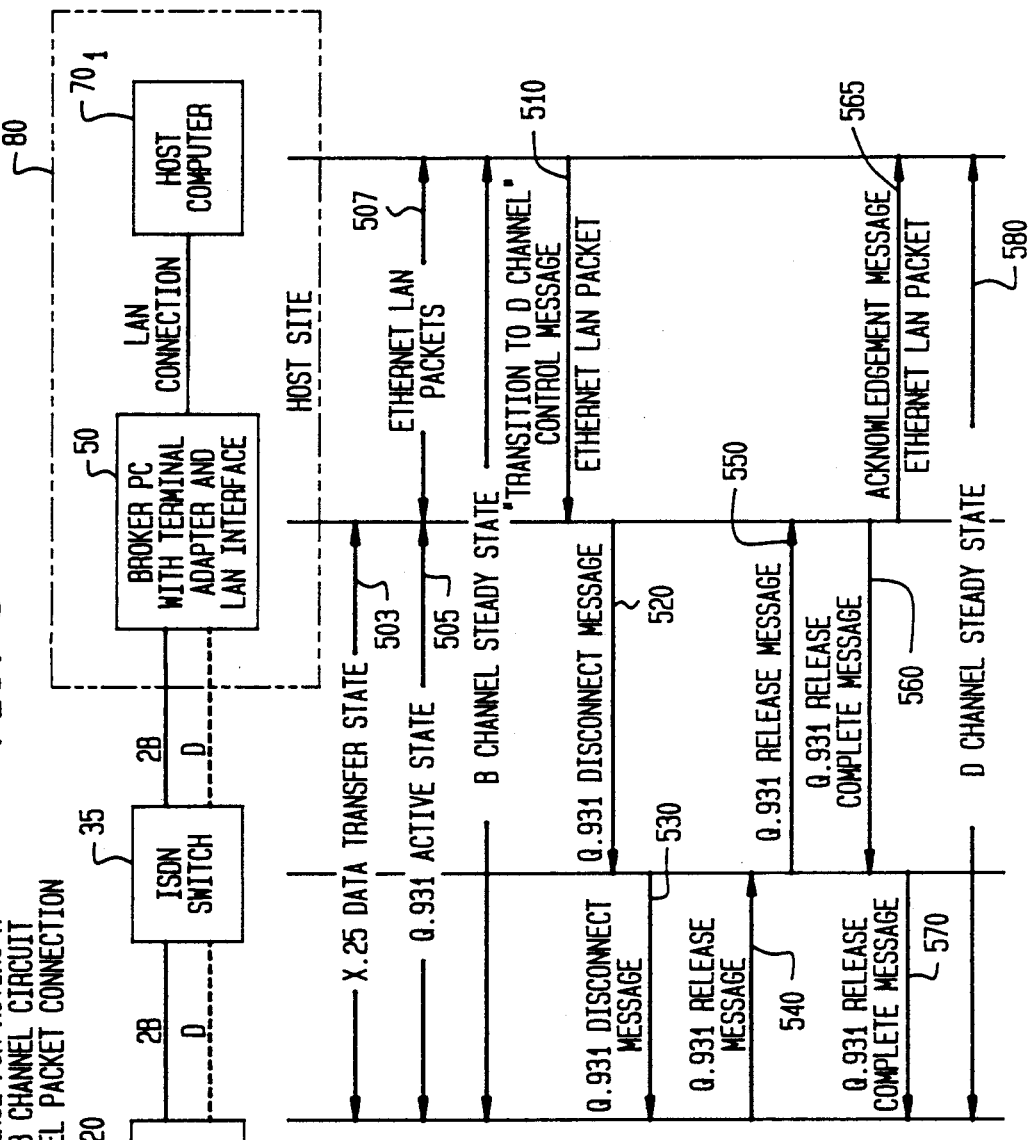

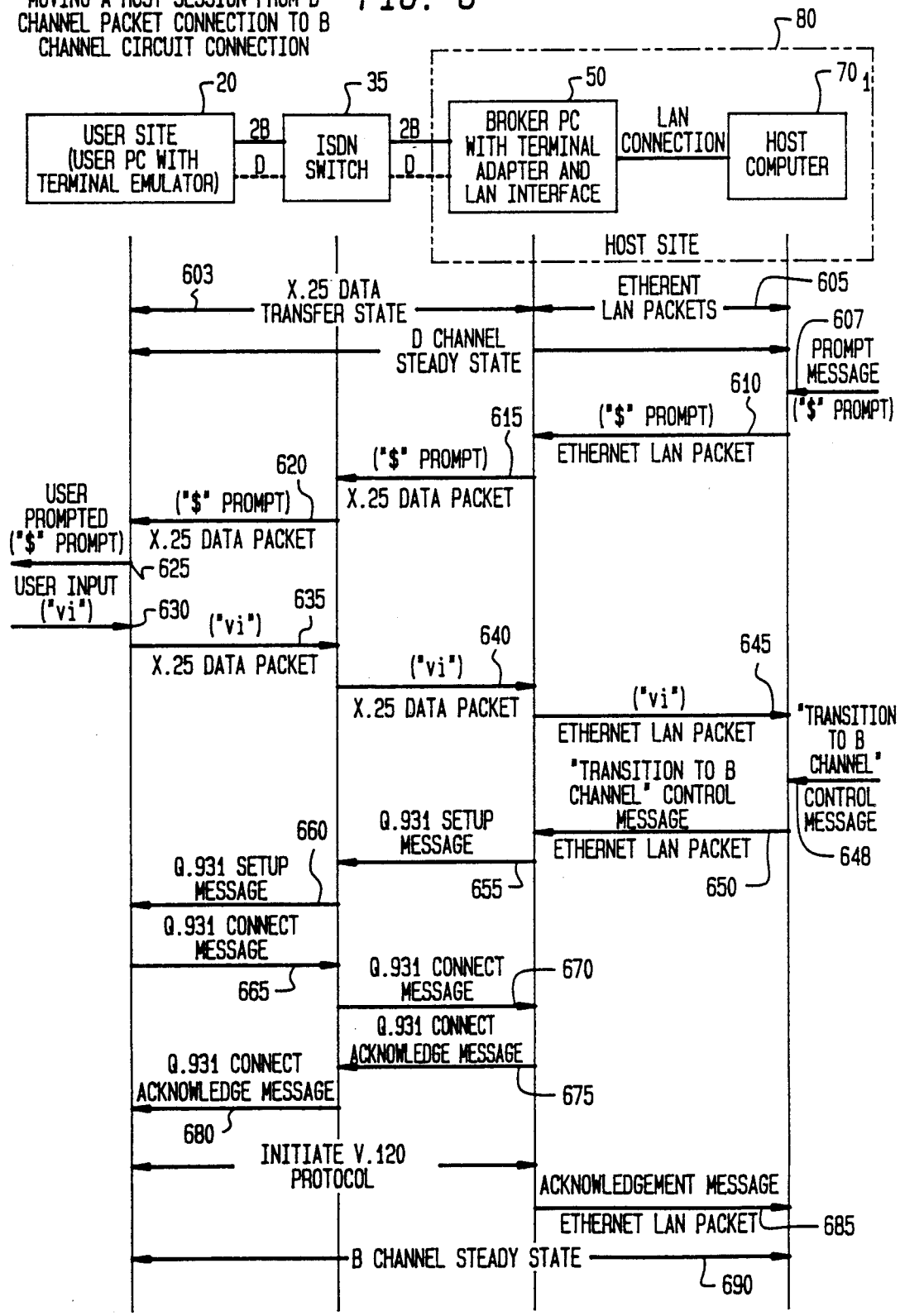

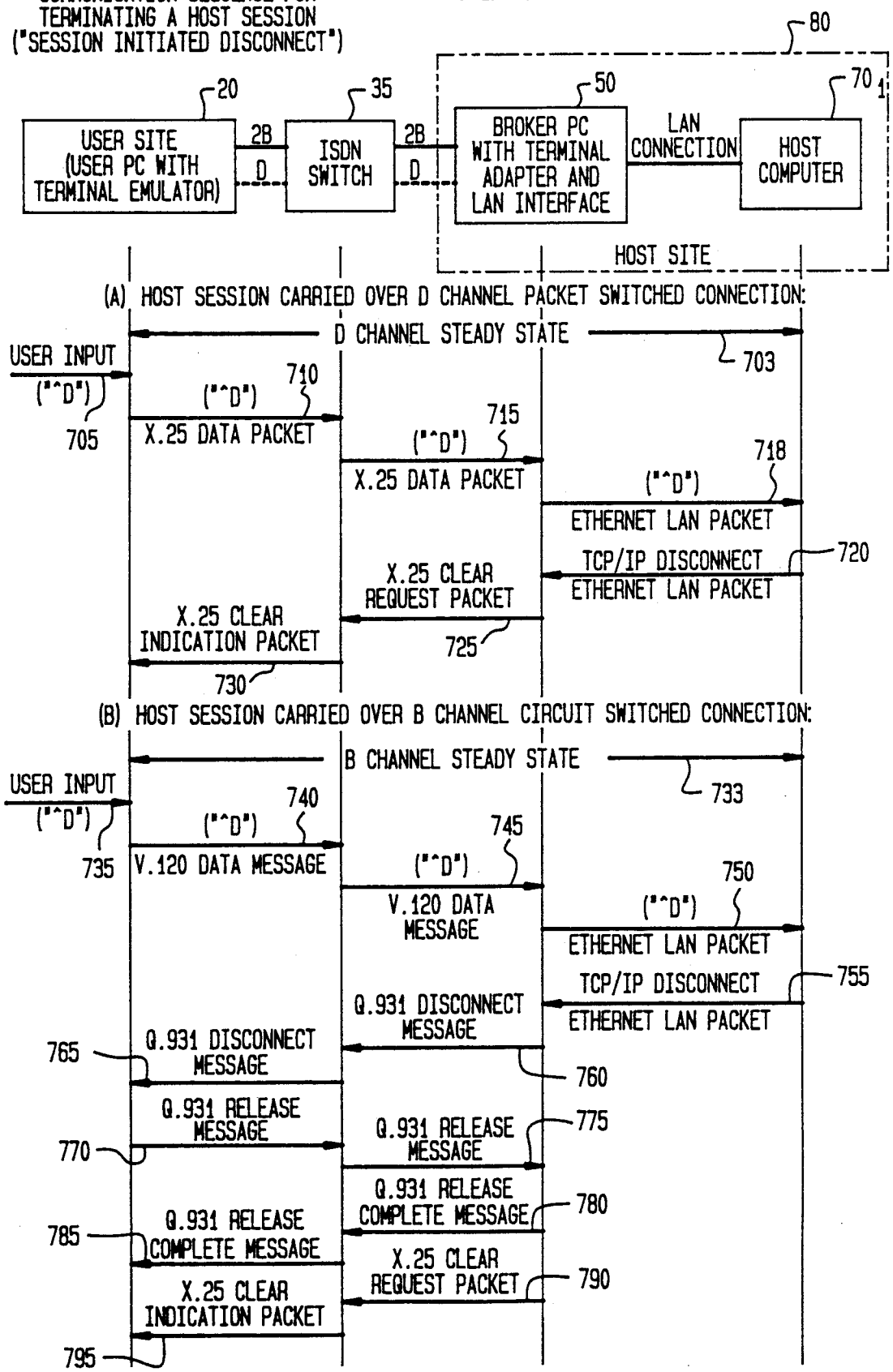

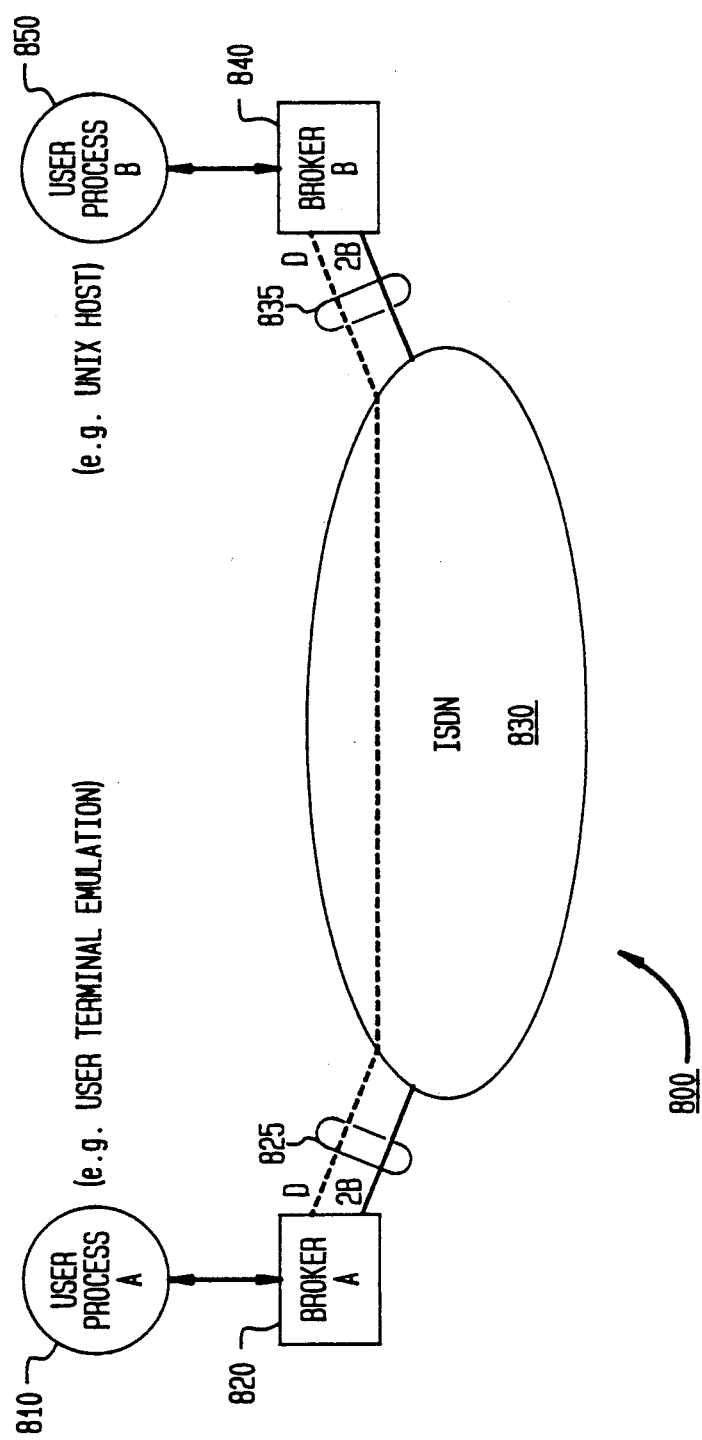

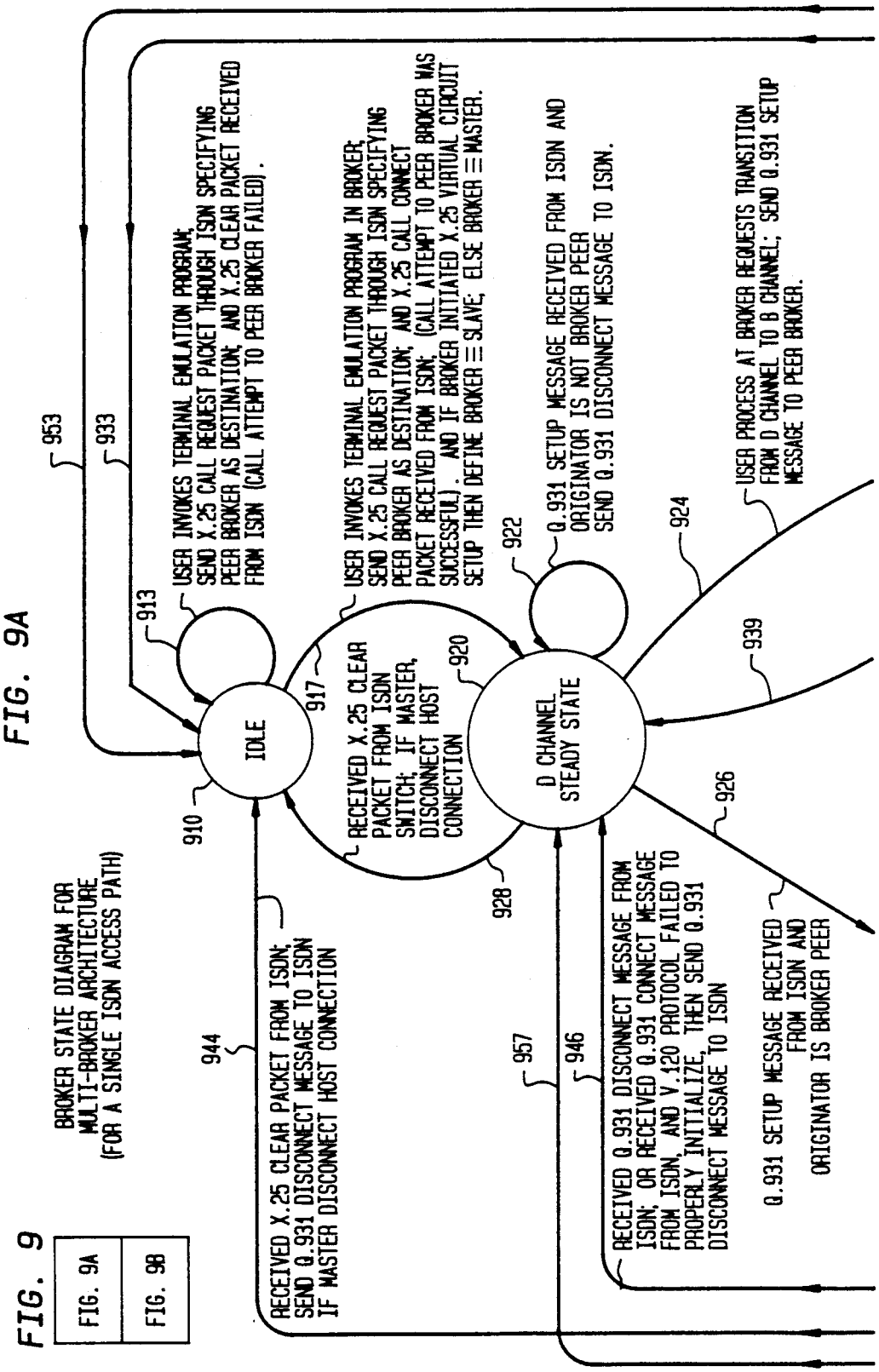

TECHNIQUE FOR DYNAMICALLY CHANGING AN ISDN CONNECTION DURING A HOST SESSION

BACKGROUND OF THE INVENTION

1. Field of the Invention

The invention relates to a technique for use in an ISDN communications system that provides an ISDN access path for connecting a host computer to a user terminal. In particular, this technique permits the host computer to dynamically change the ISDN access path between a packet switched connection and a circuit switched connection during an ongoing host session with the user in order to provide a particular ISDN connection that is most suited to the communication requirements of a current task being executed by the host computer during the session.

2. Description of the Prior Art

The Integrated Services Digital Network ("ISDN") is currently seen as a framework for providing new efficient voice and data telephonic services in the near future. As such, ISDN switches are being now being manufactured by various vendors and integrated into the telephone network by local telephone operating companies.

Within the ISDN, an ISDN access line connects each caller and an ISDN switch located at a central office. In one configuration, i.e basic access, an ISDN access path consists of two ISDN "B" digital channels and one ISDN "D" digital channel. Each "B" channel has a capacity of 64 kbits/second; while, the "D" channel has a capacity of 16 kbits/second. The "D" channel can only carry packets; while each of the "B" channels can carry either packets or continuous (circuit switched) signals. To initiate an ISDN call, a caller's terminal equipment places signalling information contained within a packet onto the "D" channel in order to, inter alia, specify to the ISDN switch what specific connection should be provided from the switch to the caller and what specific channel should be used to provide this connection, specifically whether a packet switched "D" channel connection, or if a "B" channel is to be used, which specific "B" channel should be used and whether a packet or circuit switched connection is to be established on that channel.

With this arrangement, an ISDN switch can provide either a circuit switched connection or a packet switched connection to a caller. A circuit switched connection, which can only occur on the "B" channel, provides a multiplexed communication path, in e.g. space and/or time division multiplexed fashion, between the calling and called parties that lasts throughout the entire duration of the call. As such, only one call is able to use any given switched connection through the network at any one time. In contrast, a packet switched connection merely relies on queuing packets of data at an ISDN switch for transmission between a caller, frequently a user, and a called party, typically a host computer, and then sequentially transmitting those packets, from point to point within the packet network that forms part of the ISDN as transmission capacity becomes available therebetween. Inasmuch as each user of a packet switched connection merely requires a separate address in a memory of a local switch, e.g. a memory location, to which packets can be transmitted and from which packets can be received and hence consumes relatively few network resources throughout the duration of the call, many different packet switched calls can share all the remaining network facilities, including identical communication paths.

Due to the substantial differences between the two different types of ISDN connections, circuit switched and packet switched connections each provides different advantages and drawbacks. First, a circuit switched connection provides a continuous transmission path from the caller to the called party throughout the duration of a call. Such a connection imparts relatively little, if any, transmission delay to any communication carried over the path. Therefore, circuit switched connections are used in those communication applications, such as illustratively conversational voice traffic or highly interactive data traffic, where any appreciable transmission delay can not be tolerated. Second, circuit switched connections provide higher throughput than do many packet switched networks, such as specifically X.25 type packet switched networks. As such, communications applications that require a high throughput and low delay transmission path, such as illustratively real-time transfer of large files or transfer of high density digitized images, are ideal for transport over circuit switched connections. Unfortunately, since only one call, at least from the standpoint of a local switch and apart from any user multiplexing, can be carried over a given circuit switched connection through the network from a caller to a called party, use of a circuit switched connection tends to be quite expensive particularly if the connection is to be maintained over a prolonged period of time.

Other communication applications, which are typified by relatively long latency periods between successive transmissions from one party to the other, are bursty in nature and essentially unaffected by appreciable transmission delay. Bursty communications are ideal for carriage over a packet network. Communications of this sort illustratively include transport of user commands from a user's terminal to a host computer to initiate execution of a program that requires a relatively long processing time and relatively little user entry of information thereafter. Often, whenever a user undertakes line oriented interactive operations with a host computer, the user expects to encounter some delay after he or she enters each line of information, typically a command followed by a line delimiter which is frequently a carriage return, and before control is returned to the user. During the delay interval, the host computer processes the entered line. Unfortunately, when a packet switched network, specifically an X.25 network, carries a host session, the network often injects a noticeable amount of transport delay into the session in addition to the delay inherent in the processing time required by a host application. The time required by the host computer to process each character in the line of information is often substantially shorter than the transport delay of the packet network. Now, if the host computer was required to echo each character that the user enters back to the terminal for local display, then the transport delay inherent in the packet network would force the user to wait until some time after each character was entered in order to see the information which that line contained. The delay perceived by the user and associated with host based echoing is frequently referred to as "echoplex." Inasmuch as network delay, which is the predominant cause of echoplex, prevents the user from obtaining immediate feedback of the contents of the current line and expeditiously correcting any mistake thereon, many users find echoplex to be highly unsatisfactory and quite annoying. In an effort to eliminate echoplex that may be experienced with a packet switched network, the art teaches that a local packet assembly/disassembly ("PAD") function should be incorporated into a user terminal. In this regard, see "Packet Assembly/Disassembly Facility (PAD) in a Public Data Network", *CCITT Recommendation X.3*, 1984, CCITT document AP VIII-57-E, pages 22–44. In particular, the PAD function echoes locally entered characters for display and assembles an outgoing packet of entered characters up to a pre-defined maximum character limit and then transmits the packet upon receipt of a suitable delimiter, typically a carriage return from the user, over the network. In addition, the PAD function also dis-assembles each incoming packet supplied through the network from the host computer and locally displays the characters contained in that packet on the terminal. By providing local echoing, the PAD function advantageously eliminates echoplex and, from a user's standpoint, appears to shift all the delay, i.e. network transport and host processing, to the end of each entered line, i.e. after that line was displayed to a user, where that delay is far less objectionable to the user. Hence, because of the essentially delay-insensitive nature of bursty communications, this type of communication, particularly involving a user terminal that provides the PAD function, can be transported far more economically through a packet switched connection than through a circuit switched connection.

Thus, by virtue of the potential sharing inherent in packet switched connections and the dedication of a switched path in a circuit switched connection, packet switched connections provide a highly economical though delay prone point-to-point transport media; while, by contrast, circuit switched connections provide a relatively expensive but nearly instantaneous transport media with a relatively high throughput.

Oftentimes, a host session will contain periods of highly interactive communications characterized by stringent maximum delay requirements between the host computer and the user, during which the local echo and line buffering PAD functions are disabled by the host, and latent periods that are punctuated by bursty transmissions. For example, a substantial amount of this interactivity, on a keystroke-by-keystroke basis, often occurs during use of an interactive screen editor. In particular, an interactive screen editor often utilizes the same character key to provide several different functions, with each function selected by depressing a keyboard sequence containing a given character key, e.g. a "j" key, along with various control, function or escape keys. As such, to provide the appropriate indication on the user terminal, e.g. moving a cursor down one line when a "j" key is depressed while the user is in the control mode of a "UNIX" "vi" screen editor (UNIX is a registered trademark of the American Telephone and Telegraph Company), in lieu of always displaying the character "j" associated with the depressed key itself, the host application (e.g. the "UNIX" "vi" editor) disables the PAD function on the user terminal and provides appropriate character echoing or other indication back to the user terminal. In this regard, see "Procedures for the Exchange of Control Information and User Data between a Packet Assembly/Disassembly Facility (PAD) and a Packet Mode DTE or Another PAD", *CCITT Recommendation X.29*, CCITT document AP VIII-59-E, 1984, pages 55–72. To assure that the user is provided with a sufficiently fast response time to support a high degree of keystroke interactivity without objectionable echoplex, the communication media, such as a network connection, that connects the host computer to the user is constrained to impart less than a pre-defined maximum amount of transport delay to any transmission carried thereover.

From time to time, the user may step away from a terminal or turn to an entirely different matter resulting in a temporary cessation of host activity with the user. Such a cessation, depending upon what the user is doing, may last several hours. During such a cessation, the host session itself still remains active, although the host computer is only instructing the terminal to display a cursor to prompt the user for subsequent input. This function is typically handled by a low level communications process that executes in the host computer or in a front end communications processor associated therewith. If the user terminal is configured to provide local processing, such as that which could occur with illustratively a personal computer or workstation, then similar host inactivity could occur once the workstation receives a requested file from the host computer and proceeds to process the file locally as instructed by the user. Though, in this instance, the host session is typically maintained in an active state while local processing occurs, communication with the host computer, other than a minimal amount necessary to keep the host session active, generally only occurs whenever information is to be transferred to or from the host computer to the workstation. Here too, depending upon the amount of processing that is to be locally accomplished, the host computer may effectively see a cessation of activity from the user over a period of time that may last several hours.

The recognition that data communications can contain both highly interactive delay-sensitive transmissions which are best transmitted over a circuit switched connection and bursty transmissions which are best transmitted over a packet network is seen in illustratively U.S. Pat. No. 4,539,676 (issued to J. A. Lucas on Sept. 3, 1985 and hereinafter referred to as the '676 patent). Specifically, the '676 patent discloses an integrated voice/data, though non-ISDN, switch that contains a separate circuit switch and a separate packet switch. Each user terminal provides incoming information to the voice/data switch in the form of a pair of eight bit bytes. Each pair of bytes contains a control byte that has a routing bit and a data byte. The terminal sets the routing bit to an corresponding value that specifies whether the accompanying data byte is to be routed within the voice/data switch to either the circuit switch or to the packet switch for transmission to a called destination through a respective circuit switched network or packet switched network. As such, successive data bytes can be routed via either a circuit switched or a packet switched connection based upon the value of the corresponding routing bits. To provide this routing with minimal delay, the voice/data switch and the networks are disadvantageously required to maintain both the circuit switched connection and the packet switched connection in an active state throughout the entire duration of the call. Consequently, the methodology taught by the '676 patent tends to be quite inefficient for the telephone network and expensive for a user.

Now, if an ISDN access path is used to connect a host to a user, then, as is taught in the art, the particular connection (circuit switched or packet switched) that is established at the inception of the ISDN call to provide this path is that which occurs throughout the remainder of the ISDN call, i.e. the host session. See, for example, U.S. Pat. Nos. 4,731,782 (issued to T. Shimizu et al on Mar. 15, 1988) and 4,569,041 (issued to T. Takeuchi et al on Feb. 4, 1986). Although this approach in the art has several drawbacks, as discussed below, particularly when communication needs change during a host session, a user is much more apt to readily accept these drawbacks rather than to submit to the burdens associated with changing an ISDN connection during the host session.

In particular, certain applications where local processing can not be used, such use of host based keystroke interactive screen editors, rely on the host to echo each character that the user enters into a terminal, through a point-to-point communication circuit that is assumed to have low delay, back to the terminal for appropriate local display. Unfortunately, the echoplex that results when host based echoing is carried over a packet switched network frequently frustrates and annoys users. Consequently, if a user has initiated a host session through a packet switched connection and enters what he or she believes to be a period of heavy keystroke interactivity with the host and which typically requires stringent maximum delay requirements and host application disabling of any PAD functionality at the terminal, then, to circumvent the frustration associated with echoplex that would otherwise occur during this period, the user may be constrained to follow one of two alternative procedures. First, the user could tear down the current host session and initiate a subsequent host session over a circuit switched connection to undertake this interactivity. Tearing down and then re-initiating a host session typically requires terminating various host processes then executing, saving files, logging off the host, dis-connecting the packet switched ISDN link, re-establishing a new ISDN link on a circuit switched channel, re-executing a "login" procedure including what is often a lengthy security check procedure, accessing the file that has just been saved, and re-starting the host processes that were previously terminated. As one can readily appreciate, this procedure involved with establishing a new host session is both time consuming and bothersome. Second and alternatively, if the host operating system permits multiple host sessions, as is the case with illustratively the "UNIX" operating system, the user could allocate the current host session established through a packet switched connection to one window, and open a second window containing a second host session established through a circuit switched connection. With this arrangement, the user could switch between the sessions to utilize a circuit switched connection for those highly interactive delay-sensitive host tasks that disable the PAD in the local terminal and a packet switched connection for other host tasks. Unfortunately, with this alternative procedure, the user is still required to build a second session and re-execute a lengthy "login" procedure which is both bothersome and time consuming to the user. Therefore, to avoid following either of these procedures, a user generally establishes a circuit switched ISDN connection to the host computer prior to the inception of a host session rather than a packet switched connection and then retains that circuit switched connection throughout the entire host session regardless of the specific host application(s) that is executed during that session.

Unfortunately, the presence of bursty communications in a typical host session poses several drawbacks to both the user community and the local telephone companies if a user is permitted to establish a circuit switched ISDN connection to a host computer and then retain that connection throughout a lengthy host session. For a user, circuit switched connections are far more expensive than packet switched connections. Therefore, during any period of relative inactivity particularly during a prolonged interval of time, a user is paying a significant premium for using a circuit switched connection when, in fact, little, if any, communication is being transferred thereover. In addition, the switches installed in the central offices of the local telephone companies frequently do not have sufficient capacity to handle a significant number of simultaneously occurring circuit switched connections each having a long holding time, such as several hours. In particular, local telephone switches are generally designed to provide a capacity of 3–4 CCS (one hundred call seconds) per access line, i.e. a local switch designed to handle 30,000 different access lines with a capacity of 3 CCS can simultaneously accommodate a call lasting 5 minutes on each different line. Hence, the occurrence of a substantial number of simultaneously occurring circuit switched ISDN calls with relatively long holding times can severely strain the capacity of a local switch. Unfortunately, local telephone companies are simply unable to add sufficient circuit switched capacity to handle these calls while still providing circuit switched connections in a relatively cost-effective manner.

Therefore, a need exists in the art for a technique for use in conjunction with an ISDN switch for dynamically changing an ISDN access path, that connects a user to the switch and therethrough to a host computer, between a circuit switched connection and a packet switched connection during a host session according to the communication demands of the host computer that occur during the session. By changing the access path in this fashion, a user would be able to much more efficiently and economically utilize the ISDN than has been possible in the art. Furthermore, to advantageously eliminate any burden on the user, any such dynamic change should be made in a manner that is invoked by the host computer, does not disrupt the host session and is substantially, if not totally, transparent to the user. Moreover, by dynamically matching the ISDN access path to the bandwidth requirements of the current task being executed on the host, the efficiency of the ISDN advantageously increases as does the ability of the telephone company to provide ISDN services sufficient to meet the expected demand of all its users.

SUMMARY OF THE INVENTION

These and other similar deficiencies associated with ISDN communication systems known in the art are advantageously eliminated in accordance with the present invention by: dynamically changing the ISDN access path that is established through an ISDN communication system, e.g. an ISDN switch, between a user terminal and a host computer from a first connection, such as a B channel circuit switched connection, to a second connection, such as a D channel packet switched connection or vice versa during an ongoing host session carried over that access path in order to provide the particular connection, either B channel circuit switched or D channel packet switched, that is most suited to the current communication needs of the session. As such, the ISDN connection provided over the access path, rather than being static as is taught in the art, dynamically changes in response to commands (suitable control messages) that are issued by the host computer thereby effectively matching an available communication channel to the current host task being executed during the session. This dynamic matching of network resources to host requirements advantageously minimizes wasted transmission bandwidth and conserves network resources.

In particular, the apparatus that embodies our inventive technique has means, for connection to one end of the access path and to a host computer, for instructing a communication system, e.g. the ISDN network, that provides the access path to change a connection provided over that path between a B channel connection and a D channel connection in response to a command received from the host computer during execution of the host session, wherein the instructing means has means for establishing an interface to the host computer to begin the host session and for maintaining the interface substantially throughout the remainder of the host session and means, responsive to the interface and for connection to the one end of the access path, for receiving a command over the interface from the host computer requesting a change in the connection provided over the access path between D and B channel connections and for supplying the command over the access path in a pre-defined form as an instruction to the communication system to effectuate the requested change.

In accordance with a specific embodiment of the invention, a communications processor called a "broker" is connected between the host computer and the ISDN network. The broker passes communication between the host computer and the ISDN network and, in response to the commands generated by the host computer to change the ISDN connection, issues corresponding instructions, to the network in order to effectuate each such change. These host commands, such as "Transition to D Channel" and "Transition to B Channel" are determined by the communication requirements of the current task, i.e. host application program, executing during the session.

A user terminal, which is connected to an end of the ISDN access path that is opposite to that connected to the broker, bi-directionally communicates with the host over the access path. To establish a host session, a user situated at the user terminal enters an appropriate message identifying the host computer into the user terminal. The user terminal then provides a control message to the ISDN network that instructs the network to establish a D channel ISDN connection to the terminal and extend this connection to the broker. After the network is able to successfully extend the ISDN D channel connection to the broker, the broker establishes a connection, such as over a local area network (LAN), to the desired host computer and thereafter provides appropriate protocol conversion, such as X.25 to Ethernet protocols, to enable the user to communicate through the ISDN network to the host computer. At this point, the user terminal, the broker and the host computer all jointly reside in a D Channel Steady State condition. The user then receives a "login" sequence from the host which, if a successful login occurs, permits the user to subsequently execute host application programs. The D channel state continues throughout the duration of the host session. In the event the user executes a host application that has stringent delay requirements and, as such, can generate objectionable echoplex if carried over a D channel packet connection, the host computer generates a command to the broker to initiate a transition of the ISDN communication channel from D to B. The broker, in response to such a command, generates an appropriate instruction, such as a corresponding Q.931 control message, to the network. The network then establishes a B channel circuit switched connection to the broker and also extends this connection to the user terminal. If this connection is successfully established by the network between the user terminal and the broker, the user terminal, the broker and the host computer all jointly reside in a B Channel Steady State condition. As such, while in this state, data is subsequently carried over the B channel connection. Although the D channel connection remains active, it only carries ISDN control messages, i.e. in the X.25 and Q.931 protocols while the B channel connection is in use. Once the need for a circuit switched ISDN connection disappears, such as for example by the user instructing the host to execute a different application program, the host computer generates an appropriate command to the broker to initiate a transition back to the active D channel connection and tear down the B channel connection. From this point, data communication is carried as X.25 packet traffic over the ISDN access path between the user terminal and host computer. A subsequent B channel connection will be successively established with the user terminal with data communication being carried thereover and then torn down with data communication being shifted to the D channel as communication needs of the host computer dynamically change during the host session.

BRIEF DESCRIPTION OF THE DRAWINGS

The teachings of the present invention may be readily understood by considering the following detailed description in conjunction with the accompanying drawings, in which:

FIG. 2 shows the proper alignment of the drawing sheets for FIGS. 2A and 2B;

FIGS. 2A and 2B collectively depict a state diagram of the software that is implemented within User PC 10 that forms part of system 5 shown in FIG. 1 and used in conjunction with dynamically managing a single ISDN access path appearing therein;

FIG. 3 shows the proper alignment of the drawing sheets for FIGS. 3A and 3B;

FIGS. 3A and 3B collectively depict a state diagram of the software that is implemented within Broker PC 50 that forms part of system 5 shown in FIG. 1 and used in conjunction with dynamically managing a single ISDN access path appearing therein;

FIG. 4 depicts a communication sequence that occurs among the major elements of system 5, specifically the User PC, the ISDN switch, the Broker PC and a host computer, for establishing a host session between the host computer and the User PC;

FIG. 5 depicts a communication sequence that occurs among the major elements of system 5 for moving a host session from a B channel circuit switched connection to a D channel packet switched connection;

FIG. 6 depicts a communication sequence that occurs among the major elements of system 5 for moving a host session from a D channel packet switched connection to a B channel circuit switched connection;

FIG. 7 depicts a communication sequence that occurs among the major elements of system 5 for invoking a session initiated disconnect in order to terminate a host session;

FIG. 8 depicts a generalized embodiment (multi-broker architecture) of our inventive system in which a plurality of, e.g. two, brokers are inter-connected through an ISDN to carry a session therebetween and where either broker can dynamically change an ISDN access path that connects the communicating brokers between a circuit switched connection and a packet switched connection according to the communication demands that occur during the session; and FIG. 9 shows the proper alignment of the drawing sheets for FIGS. 9A and 9B;

FIGS. 9A and 9B collectively depict a state diagram of the software that is implemented within any broker that forms multi-broker system 800 shown in FIG. 8 and used in conjunction with dynamically managing a single ISDN access path appearing therein.

To facilitate understanding, identical reference numerals have been used, where possible, to denote identical elements that are common to various figures.

DETAILED DESCRIPTION

After reading the following detailed description, those skilled in the art will clearly realize that the teachings of the present invention can be readily applied to and incorporated within substantially any transmission network that can connect a host computer to a user through two or more separate communication connections that have differing attributes, such as illustratively throughput, transport delay or cost of use. For example, one such connection may be optimized to carry high density low-delay traffic; while the other connection may be optimized to carry relatively low density traffic that is relatively delay insensitive. As such, the network could be a private network with a T1 backbone in which a portion of the available network bandwidth is allocated to an X.25 type packet network with the remainder of the bandwidth allocated to traffic that is to be routed through a relatively fast switching device, such as an electronic circuit switch. Alternatively, the network could be a broadband ISDN network in which: a continuous digitized video signal could be routed through a circuit switched connection established over any one of several broadband channels; voice and other delay sensitive traffic could be routed over circuit switched connections established through any one of a number of relatively narrowband channels, and other traffic could be routed on a packet basis through packet switched connections established through channels designed to be interfaced to respective local and/or metropolitan area networks. Nonetheless, for purposes of illustration and to simplify the following discussion, the invention will be discussed in the context of use with narrowband ISDN "B" and "D" channels, i.e. basic ISDN access lines that each has two 64 kbits/second "B" channels (that each provides either circuit switched or packet switched connections) and one 16 kbits/second "D" channel (that only provides packet switched connections).

Figure 1:
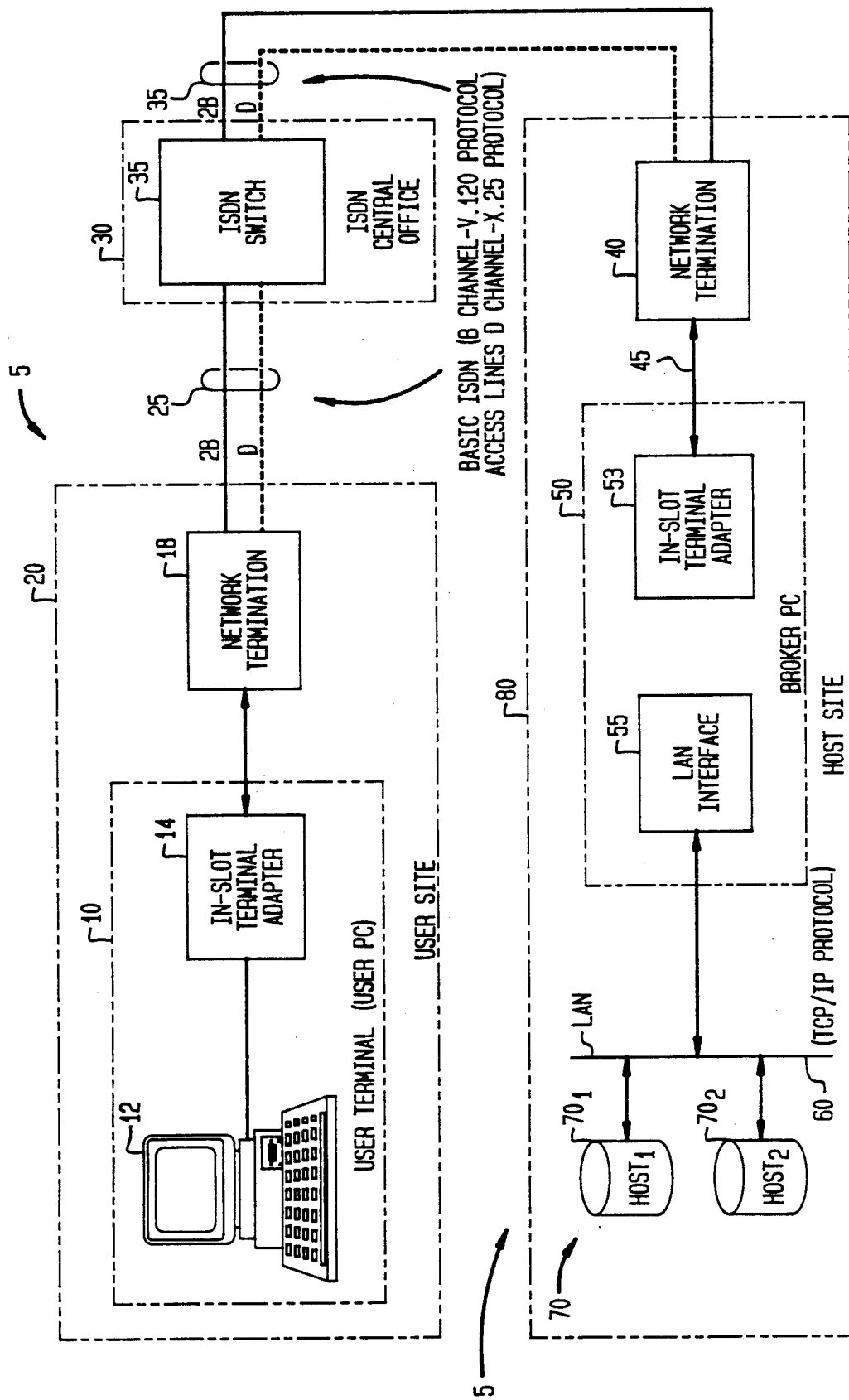
FIG. 1 depicts a block diagram of a specific embodiment of our inventive system for dynamically changing an ISDN access path, that connects a user to an ISDN switch and therethrough to a host computer, between a circuit switched connection and a packet switched connection during a host session according to the communication demands of the host computer that occur during the session.

With this in mind, FIG. 1 depicts a block diagram of the hardware that implements inventive system 5 for dynamically changing an ISDN access path, that connects a user terminal to an ISDN switch and therethrough to a host computer, between a circuit switched connection and a packet switched connection during a host session according to the communication demands of the host computer that occur during the session. In this regard, highly interactive delay-sensitive host tasks that disable a packet assembly/disassembly ("PAD") function in the local terminal are carried over a circuit switched ISDN connection, while a packet switched ISDN connection is used to carry traffic for other host tasks.

As shown, system 5 establishes an ISDN connection between user site 20 and host site 80 for carrying a host session therebetween on either a B channel circuit switched and/or D channel packet switched basis. The ISDN B channel packet capability is not used by our inventive system and, as such, will not be discussed hereinafter. User terminal 10 is situated at user site 20 and consists of personal computer 12, such as illustratively an "IBM" model PC or "PC/XT" personal computer (PC) [IBM is a registered trademark of the International Business Machines Corporation of Armonk, New York which also owns the trademark PC/XT] or the like, and in-slot terminal adapter 14 which is mounted within the PC. The terminal adapter is illustratively an "ISDN Integrated Terminal Adapter" number Teleos B100PC currently manufactured by Teleos Communications Corporation located in Eatontown, New Jersey with its accompanying control software also available from Teleos Communications Corporations and executing within the PC. The user terminal includes a user keyboard and a user display screen. This terminal could include other peripheral devices (well known and not shown), such as, for example, floppy and/or hard disk drives, a scanner and/or a printer, which can be used for purposes of user input and output. To simplify the following discussion, user input will originate from the keyboard and user output will be written to the display screen. For the sake of convenience, the entire user terminal will be hereinafter referred to as the User PC. The terminal adapter couples the User PC to a physical ISDN 2"B"+"D" connection appearing on line 15 and supports software that executes in the User PC that simultaneously uses "D" channel packet switching and "B" channel circuit switching connections. In addition, the terminal adapter also provides the PAD function as defined by CCITT Recommendation X.3. For detailed information regarding this function, the reader is referred to "Packet Assembly/Disassembly Facility (PAD) in a Public Data Network", *CCITT Recommendation X.3*, 1984, CCITT document AP VIII-57-E, pages 22–44. The User PC is connected, via line 15, to network termination 18 situated at the user site. The network termination, typically a model "ISDN/NT" network termination manufactured by Siemens Corporation, terminates the ISDN access line, which may be implemented over a multiplexed digital loop carrier (DLC) link, running from ISDN switch 32 located at ISDN central office 30 to the user site. Depending upon the needs of the user, the network termination can merely provide a two or four wire loop from a DLC link or can be a private branch exchange (PBX) which provides local multiplexing, switching, protocol handling and concentration functions. To simplify the discussion, all the network terminations will be assumed to merely couple a basic ISDN access line, i.e. a 2"B"+"D" link, over a DLC link from the ISDN switch into a two wire loop, e.g. line 15, for connection to associated terminal adapters. ISDN switch 32 is illustratively a model EWSD/PH ISDN switch currently manufactured by Siemens Corporation and is situated at a central office operated by a local telephone company. Communication is carried over the D channel on an end-to-end basis using the CCITT X.25 protocol (hereinafter referred to as the X.25 protocol), while communication is carried over the B channel on an end-to-end basis using the CCITT V.120 link layer protocol (hereinafter referred to as the V.120 protocol) for reliable data carriage. For detailed information regarding the V.120 protocol, see *CCITT Recommendation V.120*, IXth Plenary Assembly, Melbourne, 1988, pages 111–145. Although a single ISDN switch is shown at one central office, this switch would in actuality likely be replaced by an ISDN network that contains multiple ISDN switches inter-connected by appropriate end-to-end transport and toll switching facilities. Nonetheless, for simplification, the drawing and the ensuing discussion will discuss, the ISDN network in the context of containing switch 32 situated at central office 30.

Switch 32 also provides a basic 2"B"+"D" ISDN connection, via access line 35, to host site 80. Within the host site, incoming communication from the user terminal to host system 70 is carried from access line 35 sequentially through network termination 40 and PC 50 through local area network (LAN) 60 onward to the host system and in the reverse direction for outgoing traffic from the host system to the User PC. Host system 70 illustratively contains independent host computers $70_1$ and $70_2$, each of which is illustratively a "DEC" "μVAX" computer currently manufactured by the Digital Equipment Corporation of Maynard, Massachusetts (which also owns the trademarks DEC and μVAX) executing the "UNIX" operating system (UNIX is a registered trademark of American Telephone and Telegraph of New York, New York). A user can conduct a host session with either host computer, depending upon where a desired host application program resides. Inasmuch as the following discussion applies equally to both host computers, then, to simplify this discussion, the desired host application will be assumed to reside in host computer $70_1$ with which, unless otherwise specifically noted below, the user will conduct a host session.

PC 50, hereinafter referred to as the "Broker PC", functions as a communications processor to provide an ISDN interface to the host system 70 and also to instruct ISDN switch 32 to dynamically change the ISDN connection provided during a host session over both access paths 25 and 35 between a B channel circuit switched connection and a D channel packet switched connection according to the communication demands of the task presently executing on host computer $70_1$ as part of a current host session. The Broker PC is illustratively an IBM model "PC/AT" personal computer currently manufactured by the IBM Corporation (which also owns the registered trademark PC/AT) or the like. As discussed in detail below, the host computer suitably instructs the Broker PC to change the communication channel during an on-going host session from circuit switched to packet switched as the communication needs of the host computer that occur during the host session change. This change occurs in a fashion that does not disrupt the host session and is substantially, if not totally, transparent to the user. By dynamically selecting the specific ISDN connection available over ISDN access paths 25 and 35 to match the bandwidth requirements of the current task being executed on the host computer, the efficiency of the ISDN network advantageously increases as does the ability of the local telephone company to provide ISDN services sufficient to meet the expected demand of all its ISDN users.

Specifically, at the host site, network termination 40 couples basic ISDN 2"B"+"D" access line 35 to the Broker PC via line 45. The Broker PC is itself coupled to host system 70 through well-known LAN interface 55 which, in turn, is connected to local area network 60, which is illustratively an Ethernet LAN that uses TCP/IP protocol (transmission control protocol/internet protocol). For detailed information regarding the TCP/IP protocol, see *DDN Protocol Handbook, Volume Two -- Darpa Internet Protocols*, Defense Communications Agency, December 1985, pages 2-99 to 2-149 for the IP protocol and pages 2-179 to 2-269 for the TCP protocol. The LAN interface is illustratively an in-slot model EXOS 205T Intelligent Ethernet Controller currently manufactured by EXCELAN Incorporated of San Jose, California and which utilizes, as communication software executing within the Broker PC, "The LAN Workplace for PC DOS Socket Library" program that is currently available from EXCELAN Incorporated. LAN interface 55 and host computers $70_1$ and $70_2$ each possess different network addresses on LAN 60. The LAN carries Ethernet LAN packets. These packets contain either packet traffic associated with the "D" channel that forms part of basic ISDN access line 35 or circuit switched traffic associated with a corresponding one of the "B" channels that also forms part of this basic ISDN access line. The Broker PC contains in-slot terminal adapter 53 which is substantially identical to terminal adapter 14. Adapter 53 couples the Broker PC to a physical two wire ISDN 2"B"+"D" connection appearing on line 45, supports software that executes in this PC for simultaneously using "D" channel packet switching and "B" channel circuit switching connections and also incorporates the PAD function defined by the CCITT X.3 and X.29 Recommendations within the Broker PC.

The discussion will now address the software that is used within inventive system 5. This software consists of three sections: that which executes within User PC 10, that which executes within Broker PC 50 and lastly that which executes within the host computer. The software in executing in the User and Broker PCs is event and generally interrupt driven and triggered primarily through requests originating with the host computer to change the ISDN communication path. With this in mind, the software executing in the User PC and the Broker PC will be presented in terms of state diagrams rather than flowcharts inasmuch as these diagrams depict the event driven operation of this software more clearly and more explicitly than do flowcharts. The software executing in the host computer is not depicted due to its simplicity but will be explained in necessary detail below. Given the various states and the events that trigger a transition between these states, as shown and discussed in detail below, anyone skilled in the art can readily compose appropriate computer programs that implement this software.

Figure 2B:
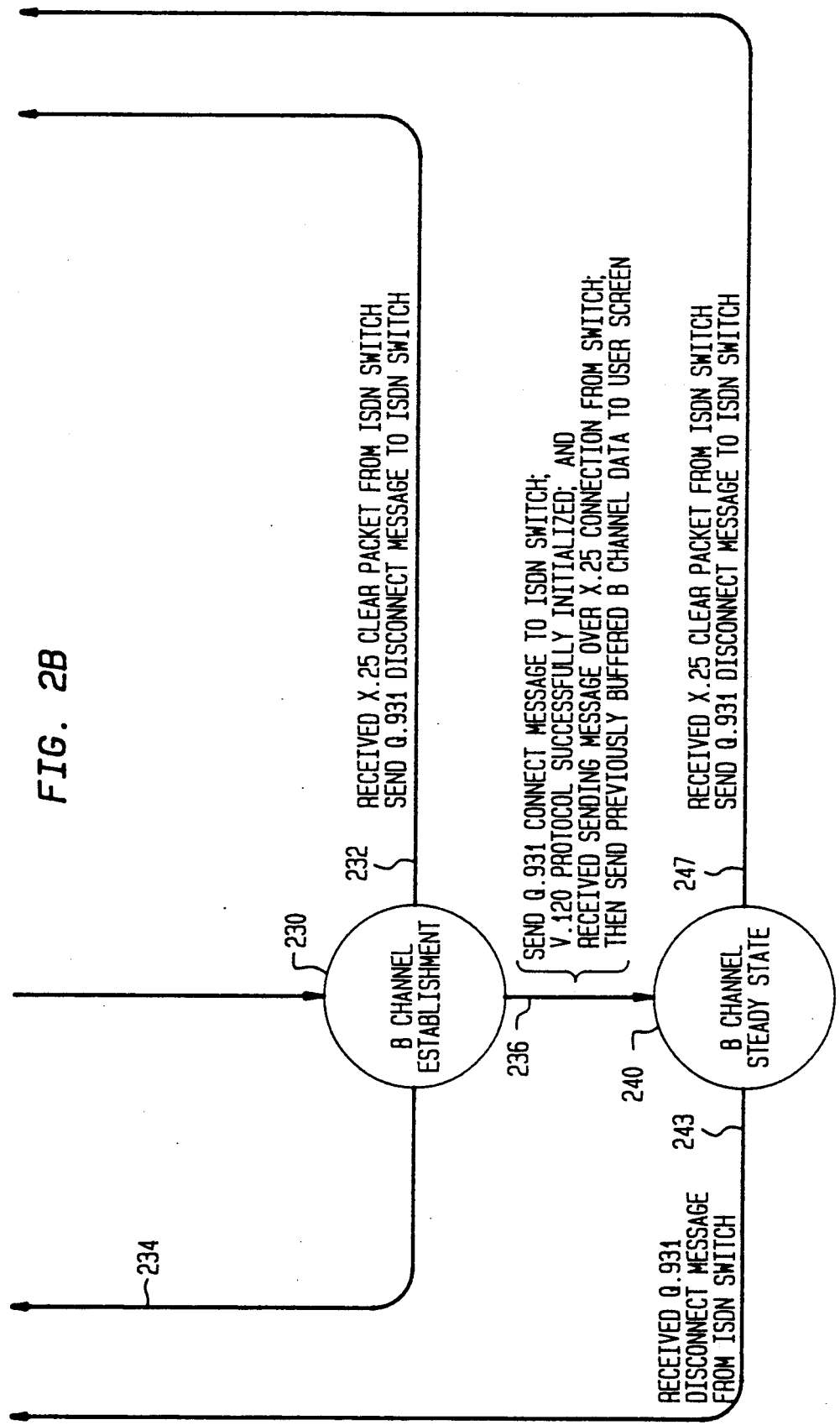
Figure 3B:
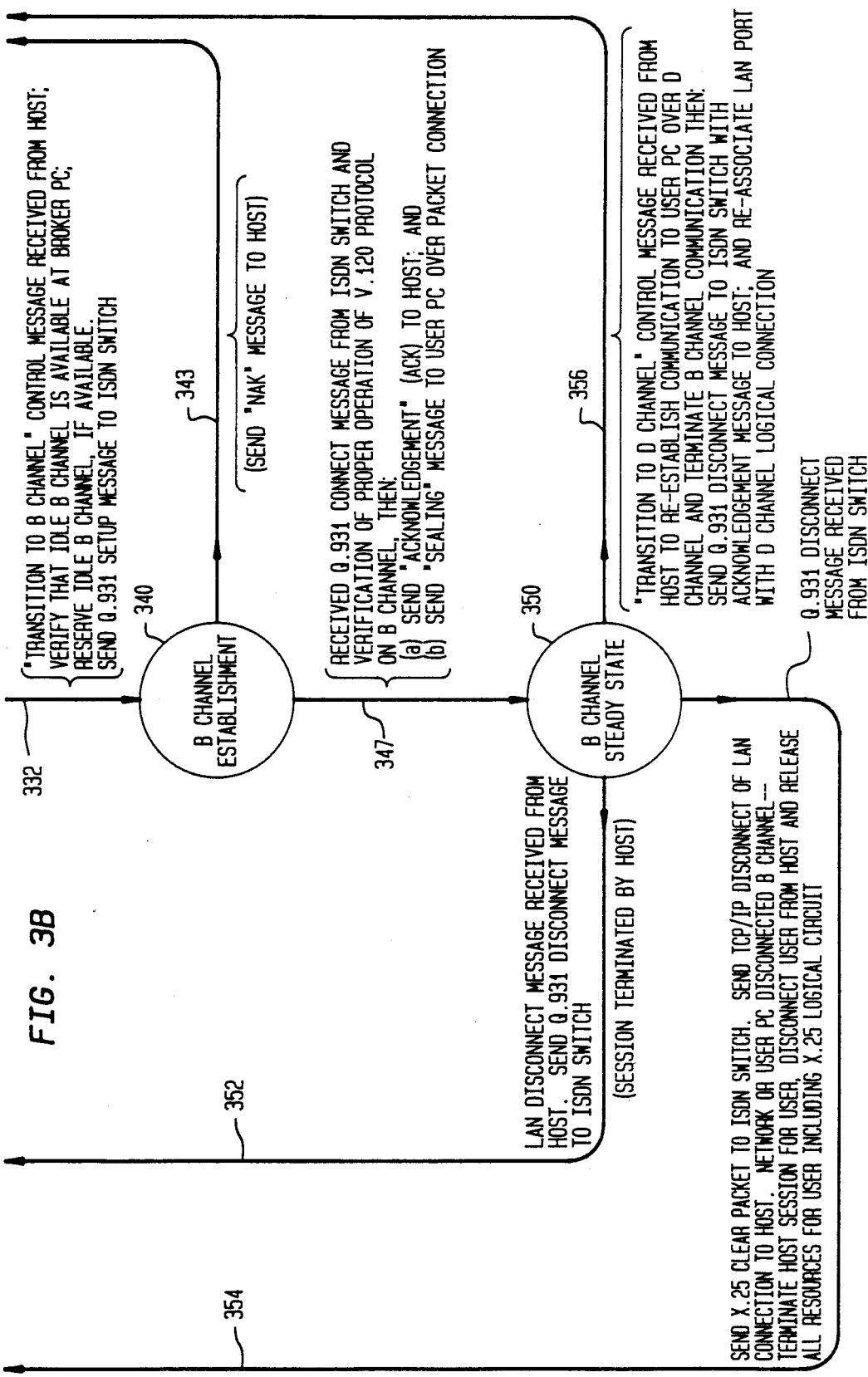

System 5 can accommodate a multitude of users to dynamically change the ISDN channel (between circuit and packet switched) used by each user in accordance with communication requirements of each corresponding host session thereby dynamically matching the available communication bandwidth to the host task presently being executed for that user. To accommodate more than one user, the User PC and the Broker PC each allocates a set of separate states to each different ISDN access path that exists for each user communicating therethrough and for each different host session in the event any user has established more than one host session involving one or more host computers. Typically, a User PC will support only one user at a time; while a Broker PC will support up to illustratively eight simultaneous host sessions communicating through eight different ISDN access paths to eight corresponding User PCs. The states allocated by the User PC and involving an ISDN access path are shown in FIGS. 2A and 2B; while those states allocated by the Broker PC for the same ISDN access path are shown in FIGS. 3A and 3B. Inasmuch as system 5 operates in an identical fashion for each different ISDN access path established between either a different user and/or a different host session and a host computer, then, to simplify the drawings and the following discussion, each user will be assumed to have established only one host session and the drawings and ensuing discussion will center on the management of one ISDN access path existing between the User PC and the host computer.

As such, a state diagram of the software that is implemented within User PC 10 and used in conjunction with dynamically managing a single ISDN access path appearing in system 5 is collectively depicted in FIGS. 2A and 2B the proper alignment of the drawing sheets for these figures is shown in FIG. 2.

Specifically, if an ISDN call has not been made from the User PC to the host computer, then the User PC resides in terminal idle state 210. In this state, the User PC remains in an idle condition with a well known terminal emulation program executing and waiting for input from a user. Once a user begins entering information into the terminal in an attempt to initiate an ISDN call to a remote host, then the User PC attempts to transition to a new state depending upon whether the call was successfully placed. In particular, inasmuch as the call is to be first established over a D channel packet switched connection, the User PC through the terminal emulation program sends an X.25 Call Request packet which specifies the Broker PC as its destination through the ISDN switch. In the event the ISDN switch cannot route the ISDN D channel call from the User PC onward to the Broker PC, such as for example if a failure occurs in the switch, then the switch sends an X.25 Clear packet back to the User PC. In response to the receipt of this packet, the User PC aborts the call and then its state transitions back to terminal idle state 210, as indicated by line 213. Alternatively, in the event the switch successfully establishes a D channel connection from the User PC to the Broker PC, i.e. by allocating a suitable virtual X.25 connection therebetween, then the ISDN switch will transmit an X.25 Call Connect packet back to the User PC in lieu of an X.25 Clear packet. In response to the receipt of the X.25 Call Connect packet, the state of the User PC transitions into the D Channel Steady State state 220. While in this state, the User PC is able to receive input data from the user keyboard that forms part of the User PC, process this data according to the X.3 and X.29 PAD Recommendations and then transmit this data as X.25 packets through the ISDN switch over the newly established D channel connection to the Broker PC. In the event any X.25 packets are received at the User PC from the ISDN switch while the User PC remains in state 220, then the User PC will display any X.25 data present in these packets onto the user screen that forms part of the User PC and appropriately process any PAD commands that are present in these packets according to the X.3 and X.29 PAD Recommendations.

Now, while the User PC resides in state 220, the User PC can receive a message, specifically a "Call Setup" message in the CCITT Q.931 protocol (hereinafter referred to as the Q.931 protocol), over the D channel from the ISDN switch. All Q.931 messages are carried as suitable packets over the D channel connection. For detailed information regarding the Q.931 protocol, see "Digital Access Signalling System", *CCITT Recommendation Q.931*. VIIIth Plenary Assembly, Malaga-Torremolinos, 8–19 October 1984, pages 57–193. The Q.931 protocol specifies the procedures for establishing, maintaining and clearing of network connections at an ISDN user-network interface. In any event, receipt of the Q.931 Setup message, if it originates with the Broker PC, indicates that the Broker PC and therethrough the ISDN switch have been instructed by the host computer to change the ISDN connection between the User PC and the Broker PC from D channel packet switched to B channel circuit switched and that the User PC should appropriately switch its ISDN connection to the switch. Specifically, once the Q.931 Call Setup message has been received by the User PC, the User PC will verify whether this message originated with the Broker PC, i.e. Broker PC 50 shown in FIG. 1, by examining the contents of a Calling Party Identification field that forms part of this message. If this message did not originate with the Broker PC, then, as shown by line 223 in FIGS. 2A and 2B, an error condition has occurred inasmuch as the User PC has received a Q.931 message from a Broker PC that is not presently associated with the User PC. As such, the User PC will transmit a Q.931 Call Disconnect message over the D channel to the ISDN switch to instruct the switch to tear down the B Channel circuit switched connection that it has just erroneously established to the User PC. Once this Disconnect message is transmitted, the state of the User PC transitions back into D Channel Steady State as indicated by line 223. If, however, the originator of the Q.931 Call Setup message was the proper Broker PC, i.e. Broker PC 50 shown in FIG. 1, then, as shown in FIGS. 2A and 2B, the User PC will transition along line 227 to B Channel Establishment state 230 to suitably change its ISDN connection to the switch.

B Channel Establishment state 230 is a transitory state. The User PC will exist within this state for a very short period of time. While in this state, the User PC will not transmit any data messages to the ISDN switch. However, the User PC will accept any keyboard input from the user and locally buffer this data for subsequent transmission. If any X.25 packets are received from the ISDN switch over the D channel connection thereto, then the User PC will locally display the data contained within these packets and will appropriately process any PAD commands contained within these packets according to the X.3 and X.29 PAD Recommendations. Also, in the event any B channel data is received, the User PC will appropriately buffer this data for subsequent display. Now, based upon whether a successful B channel connection can be established between the User PC and the ISDN switch, the User PC will transition to one of three states: D Channel Steady State 220, Terminal Idle state 210 or B Channel Steady State 240.

In particular, in the event that, while the User PC resides in state 230, the switch next sends a Q.931 Call Disconnect message to the User PC over the D channel instructing the User PC to tear down the B channel connection to the switch, then the state of the User PC transitions along line 234 back to D Channel Steady State 220. The User PC will also return to state 220 in the event it sends a Q.931 Connect message over the D channel followed by a failure of the V.120 protocol that is used for B channel communication to properly initialize. Specifically, a Q.931 Connect message will be sent by the recipient of a Q.931 Call Setup message, here the User PC, in response to this Call Setup message if the recipient successfully establishes a B channel connection to the sender of the Call Setup message, here the ISDN switch. Therefore, if the User PC successfully establishes a B Channel connection to the ISDN switch in response to the Q.931 Call Setup message it received from the switch, then the User PC will transmit a Q.931 Connect back to the switch. Once this occurs, the User PC will then invoke the V.120 protocol to handle subsequent B channel communication. If this protocol fails to properly initialize between both the User PC and the Broker PC, then terminal adapter 14, as shown in FIG. 1, will appropriately signal the User PC. IN response, the User PC, as shown in FIGS. 2A and 2B, will send a Q.931 Disconnect message back to the ISDN switch to instruct the switch to tear down this B channel connection. Thereafter, the state of the User PC will also transition along line 234 back to D Channel Steady State state 220. As such, no B channel will be established through the ISDN switch between the User PC and the Broker PC.

The User PC, while existing in B Channel Establishment state 230, could also receive an X.25 Clear packet from the host computer, thereby indicating that the D channel packet connection should be torn down. This could occur when the host computer terminates the current host session with the user. A D channel connection, which merely involves a virtual X.25 connection that consumes minimal switch and network resources, is always maintained during a host session, with a B channel connection, which consumes a relatively larger share of network resources, being established or torn down as communication requirements of the host computer change during the session. As such, as long as a host session is in progress a D channel connection will exist; however, once a host session is terminated, then the D channel connection will be terminated as well. Therefore, if the User PC receives an X.25 Clear packet while it resides in B Channel Establishment state 230, then the User PC will relinquish the D channel connection and transmit a Q.931 Disconnect message to the ISDN switch over the D channel instructing the switch to tear down the B channel connection, if it presently exists, to the User PC. The User PC will then relinquish the B channel connection, should it exist, and transition back to Terminal Idle state 210, as indicated by line 232.

Now, alternatively, in the event that the B channel connection has been successfully established between the User PC and the Broker PC as indicated by the transmission of a Q.931 Connect message by the User PC followed by successful initiation of the V.120 protocol at the User PC, then the Broker PC will transmit a "sealing" message over the X.25 D channel connection to the User PC. Such a message is used to "seal" off the X.25 connection from carrying further communication while the B channel is in use. The need for such a message arises in that once the B channel circuit switched connection is established between the User PC and the Broker PC, two parallel ISDN connections exist between these PCs: a B channel circuit switched connection and a D channel packet switched connection. As discussed above, the B channel connection has a much shorter transport lag associated with it than does the D channel connection. However, shortly prior to the inception of the B channel connection, an X.25 data packet could be transmitted over the D channel connection to the User PC and due to transport lags associated with the ISDN packet network not arrive at the User PC until after the B channel connection has been established. In such a situation, the User PC might erroneously interpret or ignore this packet of data. To assure that the User PC has received the last X.25 data packet over the D channel, the Broker PC transmits a predefined data message, i.e. a so-called "sealing" message, as an X.25 packet over the D channel. This sealing message, when received at the User PC, specifies that, now while the B channel connection exists, the User PC will temporarily receive no more data over the D channel. As such, this message also instructs the User PC to receive all data over the B channel and to subsequently ignore X.25 data that is received over the D channel. Nonetheless, the User PC is still able to receive and process X.25 command packets, such as an X.25 Clear packet, and Q.931 messages that appear over the D channel. Hence, when the User PC receives a sealing message from the Broker PC, the User PC determines that there is no further X.25 packet data to display to the user. As such, the User PC will then route any and all buffered B channel data to the user screen for display. Once this has occurred, the User PC will transition into B Channel Steady State state 240 as indicated by line 236.

While in B Channel Steady State state 240, the User PC accepts any data which the user enters via the user keyboard, processes this data according to the X.3 and X.29 PAD recommendations and then transmits the resulting circuit switched data over the B channel connection through the switch to the Broker PC. Correspondingly, in the event that the User PC receives any X.3 and X.29 PAD commands and data and over the B channel circuit switched connection, the User PC appropriately processes the PAD commands and sends the resulting data to the user screen for local display. For purposes of simplifying the actual implementation of inventive system 5, we have chosen not to allow the User PC to disable the PAD functions merely coincident with the establishment of a circuit switched connection between the User and Broker PCs. Specifically, to simplify the software, the various routines that provide the PAD function, from a software architectural standpoint, in the User PC execute at a higher level than do the X.25 routines which control the terminal adapter in the User PC. Though the PAD functions provide relatively little benefit with a circuit switched connection owing to the minimal transport lag inherent in such a connection, there appears to be no disadvantage to letting these functions operate in the User PC with these connections, unless the host specifically disables these functions. In particular, as noted and discussed below in detail, the host computer changes the ISDN access path between D and B channel connections whenever the host computer determines that local buffering at the User PC is not compatible with the communication requirements of the host application currently executing within the host session and also turns off this buffering in the User PC which otherwise would be provided by the PAD functions. In such a situation, the host computer appropriately instructs the User PC to appropriately disable the PAD functionality whenever such a host application, such as a screen editor, is executing.

Once the state of the User PC transitions into B channel Steady State state 240, the User PC remains in this state until it receives either a Q.931 Disconnect message or an X.25 Clear packet. Specifically, if the User PC receives a Q.931 Disconnect message, this indicates that the user PC is to tear down the B channel circuit switched connection and switch to D channel packet communication. As such, the User PC will then relinquish the B channel connection, should it exist, and transition back to D Channel Steady State state 220, as indicated by line 243, to subsequently communicate over the existing D channel connection. Alternatively, if the User PC receives an X.25 Clear packet over the D channel connection, then, as discussed above, the User PC will relinquish the D channel connection and transmit a Q.931 Disconnect message to the ISDN switch over the D channel instructing the switch to tear down the B channel connection to the User PC. The User PC will then relinquish the B channel connection and transition back to Terminal Idle state 210, as indicated by line 247 to await the initiation of the next host session.

A state diagram of the software implemented within Broker PC 50 that forms part of system 5 shown in FIG. 1 and used in conjunction with dynamically managing the ISDN access path between the User PC and the Broker PC is collectively depicted in FIGS. 3A and 3B; the proper alignment of the drawing sheets for these figures is shown in FIG. 3.

Initially, if a host session has not been established between the User PC and the host computer served by the Broker PC, here Broker PC 50 shown in FIG. 1, then the Broker PC remains in Port Idle state 310 shown in FIGS. 3A and 3B. In this state, the broker merely waits for an interrupt to be generated by either LAN interface 55, shown in FIG. 1, signifying that the host computer has sent a TCP/IP packet over the LAN to the Broker PC or by terminal adapter 53 signifying that the User PC is attempting to connect through the ISDN switch to the Broker PC. In particular, upon receipt of an X.25 Call Setup packet, the Broker PC will determine whether it has an ISDN port available to serve the calling party, here the User PC, and that the calling party has both a valid CCITT E.164 address for circuit switched traffic and a valid corresponding CCITT X.121 address for packet switched traffic. If such an ISDN port is not available or if either CCITT address is invalid, then the Broker PC returns an X.25 Clear packet to the ISDN switch and its state transitions, as shown in FIGS. 3A and 3B, back to Port Idle state 310, as indicated by line 313. Alternatively, if a port is available and the User PC has valid addresses, thereby indicating that the User PC has successfully dialed into the Broker PC through the ISDN switch, the Broker PC then transmits an X.25 Call Accept packet back to the ISDN switch to acknowledge that it has established an X.25 packet connection to the switch. Thereafter, as shown by line 317, the state of the Broker PC transitions to User Session Establishment state 320. This state is simply a transitory state during which no operations occur. The Broker PC will exit from this state and transition either back to Port Idle state 310 or onward to D Channel Steady State state 330 depending upon whether the Broker PC can successfully establish a connection over the LAN to the host computer. In particular, if the Broker PC is not able to connect to the host computer, because, for example, the host computer and/or the LAN is not operating, then the Broker PC transmits an X.25 data packet containing the message "Host Unavailable" back through the switch to the User PC for local display to the user situated thereat. Once this packet is transmitted, the Broker PC then transmits an X.25 Clear packet to the ISDN switch to instruct it to tear down the D channel connection. Thereafter, the Broker PC returns to Port Idle state 310, as indicated by line 323. Alternatively, if a connection was successfully established over the LAN between the Broker PC and the host computer, as part of which the broker has established a correspondence between an available port address on LAN 60 and the host computer, then, as indicated by line 327, the state of the Broker PC transitions into D Channel Steady State state 330.

In D Channel Steady State state 330, the Broker PC accepts X.25 packets from the User PC through the switch, converts these packets into Ethernet LAN packets and thereafter transmits these LAN packets over the established LAN connection to the host computer for processing. Likewise, the Broker PC also accepts X.25 packets over the LAN connection from the host, converts these packets into X.25 packets and thereafter transmits these X.25 packets through the switch to the User PC. The Broker PC does not utilize the PAD functions to process the data it receives from the host computer but rather passes the data it receives, after suitable protocol conversion, between the host computer and the User PC over the ISDN access path. The Broker PC relies on the host to provide the necessary PAD functions. The Broker PC will leave state 330 under various conditions: an X.25 Clear message is received from the switch to disconnect the D channel connection, the LAN connection to the host is to be disconnected, or a B channel connection is to be established. Specifically, if an X.25 Clear message is received from the ISDN switch, then the Broker PC terminates the session. In this case, the Broker PC instructs LAN interface 60 (see FIG. 1) to disconnect the TCP/IP LAN connection to the host computer and, once this has occurred, the state of the Broker PC transitions back into Port Idle state 310, as indicated by line 336 shown in FIGS. 3A and 3B. Alternatively, in the event the host computer disconnects the LAN connection by sending an appropriate TCP/IP message to the broker, then the state of the Broker PC transitions to Session Initiated Disconnect state 360, as indicated by line 334. State 360 is merely a transitory state which, when entered by the Broker PC, is immediately followed by transmission of an X.25 Clear packet by the Broker PC to the ISDN switch in order to disconnect the D Channel connection to the switch and, in turn via the switch as discussed above, therethrough to the User PC. Once this packet is transmitted, the state of the Broker PC transitions back to Port Idle state 310, as indicated by line 365. Now, alternatively, if the Broker PC receives a "Transition to B Channel" control message over the LAN connection from the host computer, then the Broker PC is being instructed by the host computer to change the ISDN connection from a D to a B channel connection. As such, the Broker PC first verifies that an idle B channel is available at terminal adapter 53, as shown in FIG. 1, for subsequent use. Thereafter, if such an idle channel is available, then, as shown in FIGS. 3A and 3B, the Broker PC reserves that channel and subsequently transmits a Q.931 Setup message to the ISDN switch. Once this setup message has been transmitted, the state of the Broker PC then transitions along line 332 from D Channel Steady State state 330 to B Channel Establishment state 340.

The B Channel Establishment state is also a transient state; however, the Broker PC remains in this state for whatever interval of time is necessary to either successfully set up a B channel connection with the switch or determine that such a B channel connection can not be established. While the Broker PC remains in state 340, this PC continues to bi-directionally pass X.25 packets between the User PC, through the ISDN switch, and, via the LAN connection, the host computer, as occurs in D Channel Steady State state 330. Now, if Broker PC determines that an idle B channel is not available or, if such a B channel is available but a B channel connection can not be established through the switch over this channel, because for example the V.120 protocol will not properly initialize, then the Broker PC transmits a "Non-acknowledgement" (NAK) message back to the host computer to indicate that a B channel connection can not be established at this time. The state of the Broker PC then transitions along line 343 back into D Channel Steady State state 330. Alternatively, if the Broker PC receives a Q.931 Connect message from the switch and an indication (such as the V.120 protocol has properly initialized) from terminal adapter 53, shown in FIG. 1, indicating that the B channel connection has just been successfully established with the switch, then, as shown in FIGS. 3A and 3B, the Broker PC transmits an "Acknowledgement" (ACK) message back to the host to confirm the existence of presently operational B channel connection through the switch. Once this occurs, the Broker PC transmits a "sealing" message, as discussed above, within an X.25 packet over the D channel through the switch and to the User PC. Once this message is transmitted, then the state of the Broker PC transitions along line 347 into B Channel Steady State state 350.

While in B Channel Steady State state 350, the Broker PC accepts data in V.120 form over the B channel circuit switched connection from the switch and originating with the User PC and converts this data into TCP/IP packets that it then transmits over the LAN connection to the host computer. Likewise, the Broker PC accepts TCP/IP packets appearing on the LAN connection and originating with the host computer, converts this data into V.120 form and then transmits this V.120 data through the B channel connection through the switch for subsequent transmission to the User PC. As noted above, the Broker PC merely passes data after appropriate protocol conversion between the User PC and the host computer without altering the content of the data in any way. The Broker PC remains in state 350 until the host computer disconnects the LAN connection, the switch disconnects the B channel connection or the host computer instructs the Broker PC to change from the current ISDN access path from a B to a D channel connection. In particular, if the Broker PC while residing in state 350 receives a LAN Disconnect message from the host computer indicating that the host has terminated the host session and that the LAN connection between the Broker PC and the host computer should be torn down, then the Broker PC transmits a Q.931 Disconnect message to the ISDN switch to tear down the current B channel connection through the switch and between the Broker PC and the User PCs. Once this occurs, the state of the Broker PC transitions along line 352 into Session Initiated Disconnect state 360, as discussed above, in order to disconnect the current D channel connection through the switch and between the Broker and User PCs. Now, rather than disconnecting the ISDN access path in response to the termination of a host session, the Broker PC could alternatively, though not shown, provide a message to the User PC requesting that the user enter a name of a different host, e.g. host computer $70_2$ shown in FIG. 1, into the User PC so as to establish a LAN connection thereto and a host session therewith. In the event that the user decides not to establish a session with a different host computer and enters an appropriate instruction into the User PC, then the Broker PC, upon receipt of this instruction, could then appropriately disconnect the ISDN access path to the User PC.

Now, if the Broker PC, while residing in state 350, receives a Q.931 Disconnect message from the switch, thereby indicative of either the switch or the user disconnecting the B channel connection and, by so doing, terminating the host session, then the Broker PC disconnects the user from the host and frees all remaining ISDN resources that are being consumed by the user. Specifically, the Broker PC sends both an X.25 Clear message to the switch to tear down the D channel packet connection and an TCP/IP disconnect message to the host to tear down the LAN connection thereto. Once this occurs, the state of the Broker PC transitions along line 354 back into Port Idle state 310. Lastly, and alternatively, if the Broker PC, while in B Channel Steady state 350, receives a "Transition to D Channel" control message from the host computer, then the Broker PC is to tear down the B channel ISDN access path to the switch and therethrough to the User PC and to use the D channel connection for subsequent communication. In this case, once this control message is received over the LAN connection from the host computer, the Broker PC transmits a Q.931 Disconnect message to the switch. Once the Broker PC receives an appropriate Q.931 message, specifically a Q.931 Release message as shown in FIG. 5, from the switch indicating that the B channel connection is no longer functional and is being released, then the Broker PC sends an "Acknowledgement" (ACK) message to the host which acknowledges that the B channel connection no longer exists. Thereafter, the Broker PC re-associates the LAN port with the current D channel logical connection. Once this occurs, the state of the Broker PC transitions along line 356 back into D Channel Steady State state 330.

Now, having discussed the procedures, in terms of states and state transitions, followed by the User and Broker PCs, the discussion will turn to the procedures executed by the host computer. The host computer, with the exception of being cognizant of whether a particular user is communicating to it over a B or D channel connection, operates in essentially the same fashion regardless of which ISDN connection is being employed to communicate during a host session with that user. As such, there are essentially no different states that exist within the host computer and specifically correspond to either B or D channel connections and particularly changes occurring therebetween, as were defined and discussed above in conjunction with the User and Broker PCs.

In particular, the host computer first allocates and subsequently recognizes various pre-defined LAN addresses, when LAN connections are first established, as those that require a connection through a Broker PC to reach a user. At the inception of such a connection, the host computer sends standard "UNIX" "login" and "password" sequences, i.e. requesting user entry of account numbers and passwords, as Ethernet LAN packets over this LAN connection to the Broker PC. The Broker PC merely relays these sequences contained within the Ethernet packet to the ISDN switch as X.25 packets which, in turn, relays these sequences within similar X.25 packets to the user stationed at the User PC. In this manner, the host computer responds to this attempted user connection occurring through the Broker PC in much the same manner as the host computer would respond to a direct "login" attempt by either a user situated at a remote terminal or a different remotely situated host computer.

The host computer utilizes a special host protocol for communication occurring between the host computer and carried through a Broker PC to a User PC. Specifically, the host computer is able to transmit three different types of messages over a LAN connection to the Broker PC: data messages, I/0 (input/output) control messages and transition request messages. First, data messages originating from the host which include appropriate formatting commands for a given terminal emulation program being executed by the user, e.g. a DEC VT-100 terminal or the like, are passed unmodified by the Broker PC to the switch and thereby to the User PC for local display thereat. In inventive system 5, the host computer, merely to simplify the implementation, maintains the size of each data message that is sent to the Broker PC as Ethernet LAN packets that have a size equal to or less than the maximum packet size allowed by the D channel X.25 packet network, i.e. "128" octets. If any data message is larger than this size, the host computer will appropriately parse this message into contiguous Ethernet LAN packets that each contains a data message being equal to or less than "128" octets in size. These maintenance and parsing functions could alternatively be implemented in the Broker PC by suitably modifying its software. Second, I/0 control messages are generated by the host for interpretation by the User PC. These control messages are generated by the host computer in order to permit the host computer to control terminal emulation and the X.3 and X.29 PAD functions, such as local buffering and character echoing, that execute at the User PC. The Broker PC merely relays these I/0 control messages without modification to the switch which, in turn, transmits these messages to the User PC. Third, the host generates transition request messages, i.e. "Transition to B Channel" and "Transition to D Channel" messages as discussed above, to the Broker PC which instruct the Broker PC to change the ISDN access path currently being used between a D channel packet switched connection and a B channel circuit switched connection and vice versa. These transition request messages are interpreted by the Broker PC as discussed above to dynamically manage the ISDN connection by establishing the appropriate ISDN access path currently being requested by the host.

As part of this special host protocol, the host computer can receive three types of messages over a LAN connection from a Broker PC: data messages, operating system "signal" messages and transition responses. First, data messages merely contain characters that were initially typed by a user situated at the user keyboard of a corresponding User PC. The host protocol merely delivers these characters to a particular host application that the user is currently executing within the host computer and which appropriately interprets these characters. Second, the host computer can receive operating system "signal" messages, such as "Break" commands, that were generated by the user to temporarily terminate a host application and gain the attention of the "UNIX" operating system currently executing within the host computer in order to subsequently instruct the host computer accordingly to execute a subsequent host application. Third, the host computer can receive transition response messages, i.e. "Acknowledgement" (ACK) and "Non-acknowledgement" (NAK) messages, from the Broker PC. These response messages, as discussed above, report whether a transition in the ISDN access path, i.e. from a B to a D channel connection or vice versa, that has just been requested by the host computer, through a corresponding transition request message, has successfully occurred or failed.

The host computer can request a transition in an ISDN access path through two methods: through a direct operating system call or indirectly based upon the nature of host application currently executing during the host session with a user. First, the "UNIX" operating system of the host can be readily modified to contain an additional operating system call which can be directly inserted as a program statement by an applications programmer into a host application program. This specific call, when reached in the program, would appropriately instruct the host operating system to generate and transmit an appropriate transition request message, i.e. "Transition to B Channel" or "Transition to D Channel", based upon what the programmer envisions the communication requirements of the application program to be at that point in the program. Whenever this call is reached in the program, the call would execute to initiate a change in the ISDN access path and then return control to the applications program once the host computer received a transition response, either ACK or NAK, from the Broker PC. Alternatively, the host computer could initiate a transition in an ISDN access path through an indirect method wherein the host computer recognizes those applications where echoplex is likely to occur. Here, the "UNIX" operating system within host computer could easily be modified to incorporate a table that identified those specific host applications which could generate objectionable echoplex, e.g. a "UNIX" "vi" editor. In use, the host computer would merely perform a simple table look up operation whenever a user instructed the host computer to execute a new host application and, prior to executing that specific application, then initiate an appropriate transition in the ISDN access path if the name or other identifying indicia of that application appeared in the table. This table would be populated by a system administrator of the host computer based upon communication requirements supplied by the application programmers. Whenever such a programmer developed a new host application, the system administrator would be appropriately informed who would then add a corresponding entry for it to the table, including the application name and corresponding type of ISDN access path that it requires. Some application programs exhibit "echoplex" characteristics through only portions of their full execution cycle. Specifically, these portions occur when an application program has turned off the local echo and line buffering functions discussed previously. An increased degree of precision in matching the ISDN communication resource to the needs of such an application program could be obtained by triggering a transition to change the ISDN access path on not only the name or type of the application program being executed, such as through a table look up operation, but also on any change of the local echo and line buffering functions provided by that application program. Although the first method eliminates the need for table look operations, it does require modification to application source code. Inasmuch as these look-up operations consume a negligible amount of host processing time, the second method is preferred in most instances inasmuch as it eliminates the need to make source code modifications to existing application programs. Alternatively, the host computer could analyze the actual communication occurring between itself and a user and decide, based upon various pre-defined rules that specify specific thresholds for e.g. duration and/or amount of communication flowing in each direction between the user and the host computer, which type of access path should be established for any given situation and then, based upon whether these thresholds were exceeded or not, dynamically change the type of ISDN access path accordingly.

Having now discussed the procedures undertaken by the User PC, the Broker PC and the host computer, the discussion will now shift to describing the illustrative communication sequences that occur among the major components of system 5 under various exemplary system conditions: establishing a host session, moving a host session from a B channel circuit switched connection to a D channel packet switched connection, moving a host session from a D channel packet switched connection to a B channel circuit switched connection and terminating a host session through a session initiated disconnect. These illustrative sequences are shown in FIGS. 4-7. The particular portions of the sequences shown in these figures which involve the switch are merely illustrative; in fact, the timing at which the switch receives and transmits message between it and the User and Broker PCs can be different from that shown provided that the User and Broker PCs themselves receive messages in the sequence shown in these figures.

In particular, FIG. 4 depicts the communication sequence that occurs among User Site 20 (that contains the User PC executing a terminal emulation program), ISDN switch 32, Broker PC 50 (containing its terminal adapter and LAN interface) and host system $70_1$, for establishing a host session between the host system and the User PC. Specifically, to establish such a session, a user first invokes the terminal emulation program within the User PC as symbolized by line 410. Thereafter, once this program is executing, the program transmits an X.25 Call Request packet, as indicated by line 420, to the ISDN switch to establish a D channel packet switched connection therebetween. If this D channel connection is successfully established, then the ISDN switch transmits, as indicated by line 430, an X.25 Incoming Call packet to the Broker PC to specify that the latter has an incoming packet call. If the Broker PC is able to establish a D channel connection to the switch and therethrough accept the incoming packet call, the Broker PC transmits, as indicated by line 440, an X.25 Call Accept packet back to the ISDN switch. The switch, in turn, transmits, as indicated by line 450, an X.25 Call Connected packet back to the User PC. At this point an X.25 packet connection is established between the Broker PC, through the ISDN switch, and the User PC. The Broker PC next establishes a LAN connection to the host computer. To do this, the Broker PC first transmits, as shown by line 460, a TCP/IP Sync message as an Ethernet LAN packet over the LAN to the host computer. If the host computer is able to establish a LAN connection, the host computer then transmits, as indicated by line 470, a TCP/IP Sync Acknowledge message as an Ethernet LAN packet back over the LAN connection to the Broker PC. If, for any reason, the Broker PC can not establish a LAN connection with the host computer, then the Broker PC transmits an X.25 Clear message (not shown) to the ISDN switch to tear down the D channel connection that was just made. However, if the LAN connection is successfully made to the host computer and the Broker PC received the TCP/IP Sync Acknowledge message thereover, then the Broker PC merely transmits, as indicated by line 480, a TCP/IP Sync Acknowledge message as another Ethernet LAN packet back to the host computer. At this point, not only is the User PC and the Broker PC in an X.25 Data Transfer state, as shown, i.e. able to transfer packet data over an X.25 connection established therebetween, but also the host is connected to the Broker PC and can communicate therethrough with the User PC. As such, with the LAN connection now established, the host computer sends appropriate "login" sequences, as indicated by line 490, over the LAN connection to the Broker PC for eventual reception at and display by the User PC. System 5 now resides in the D Channel Steady State condition. The host session is established once the user successfully completes the appropriate "UNIX" "login" procedure.

FIG. 5 depicts a communication sequence that occurs among User Site 20 (that contains the User PC executing a terminal emulation program), ISDN switch 32, Broker PC 50 (containing its terminal adapter and LAN interface) and host system $70_1$ for moving a host session from a B channel circuit switched connection to a D channel packet switched connection. Specifically, as discussed above, as long as a host session is established, an X.25 Data Transfer State, i.e. an active D channel packet switched connection, as indicated by line 503, exists between the User PC and the Broker PC even though no communication is being carried thereover while the B channel connection is in use. Furthermore, during the existence of a B channel connection between the User PC and the Broker PC, the B channel communication path established therebetween exists in a Q.931 Active state, as indicated by line 505, with communication carried thereover using the V.120 protocol. At the same time, a LAN connection, symbolized by line 507, for the carriage of Ethernet LAN packets exists between the Broker PC and the host computer. Now, to change the ISDN access path from B channel to D channel, the host computer issues a "Transition to D Channel" message and transmits, as indicated by line 510, this message within an Ethernet LAN packet to the Broker PC. Upon receipt of this packet, the Broker PC transmits, as indicated by line 520, a Q.931 Disconnect message to the ISDN switch. The switch, in turn, transmits a Q.931 Disconnect message, as indicated by line 530, to the User PC. In response to this disconnect message, the User PC ceases to transmit further data over the B channel, releases the B channel connection and to signify this transmits, as indicated by line 540, a Q.931 Release message to the ISDN switch. The switch, in turn, transmits, as indicated by line 550, a Q.931 Release message to the Broker PC signifying that it is ceasing to transmit data over the B channel and is releasing this channel. The Broker PC, upon its receipt of this release message, transmits, as indicated by line 560, a Q.931 Release Complete message to the switch to specify to the switch that the broker has now totally released (torn down) the B channel connection. Thereafter, as indicated by line 565, the Broker PC transmits an "Acknowledgement" (ACK) message as an Ethernet LAN packet to the host computer as an acknowledgement that the B channel is no longer in use. The switch, in turn, transmits, as indicated by line 570, a Q.931 Release Complete message to the User PC to specify to the User PC that the switch has now totally released the B channel connection. At this point, the B channel connection between the User PC and the Broker PC is completely torn down and all that remains therebetween is the D channel connection with system 5 now residing in the D Channel Steady State state, as indicated by line 580.

FIG. 6 depicts a communication sequence that occurs among User Site 20 (that contains the User PC executing a terminal emulation program), ISDN switch 32, Broker PC 50 (containing its terminal adapter and LAN interface) and host system 701 for moving a host session from a D channel packet switched connection to a B channel circuit switched connection. As long as a D channel connection is being used to carry a host session between the User PC and the Broker PC, the D channel communication path established therebetween exists in a X.25 Data Transfer state, as indicated by line 603, with communication carried thereover as X.25 packets. At the same time, a LAN connection, symbolized by line 605, for the carriage of Ethernet LAN packets exists between the Broker PC and the host computer. Now, assume that the host computer has finished a current task for the user and is now prompting the user for the next task. In this case, the "UNIX" operating system executing in the host computer will generate, as symbolized by line 607, a user prompt symbol, typically a "$" character, and then transmit, as indicated by line 610, that prompt symbol within an Ethernet LAN packet to the Broker PC. The Broker PC will, in turn, place that prompt symbol within an X.25 packet and transmit, as indicated by line 615, that packet to the ISDN switch. The switch, upon receipt of that X.25 packet from the Broker PC, will forward, as indicated by line 620, that packet over the D channel connection to the User PC. The User PC will, as symbolized by line 625, dis-assemble the packet and display the user prompt symbol on the user screen situated thereat. The user seeing the prompt symbol may illustratively decide to invoke the screen editor function at this point in the host session. As noted above, the screen editor is merely one of potentially many host functions that cause echoplex to occur and hence is shown in FIG. 6 merely for illustrative purposes. Thus, to invoke the "UNIX" screen editor, the user types an entry containing the command "vi" followed by a carriage return, as symbolized by line 630, into the user keyboard. In response to this command, the User PC transmits, as indicated by line 635, an X.25 data packet, that contains the user entry, to the switch. In response to the receipt of this packet, the switch transmits, as indicated by line 640, a similar X.25 packet containing this user entry to the Broker PC. The Broker PC now transfers the user entry into an Ethernet LAN packet and transmits this LAN packet, as indicated by line 645, over the LAN connection to the host computer for processing. The host computer recognizing, through preferably a table look up operation, as discussed above, that this command will invoke a host application that generates echoplex, generates a "Transition to B Channel" control message, as symbolized by line 648, to instruct the Broker PC and therethrough the switch and User PC to change the ISDN access path from a D channel packet connection to a B channel circuit switched connection. The host then transmits, as indicated by line 650, this control message within an Ethernet LAN packet to the Broker PC. The Broker PC then issues, as indicated by line 655, a Q.931 Setup message over the D channel to the ISDN switch to establish a B channel circuit switched connection to the switch. Upon receipt of this setup message, the ISDN switch, in turn, issues, as indicated by line 660, a Q.931 Setup message over the D channel to the User PC to establish a B channel circuit switched connection therebetween. If the User PC is able to establish a B channel circuit switched connection to the switch, then the User PC transmits, as indicated by line 665, a Q.931 Connect message to the switch, and the switch issues, as indicated by line 670, a Q.931 Connect message to the Broker PC. The Broker PC then acknowledges the establishment of a B channel circuit switched connection to the switch by transmitting, as indicated by line 675, a Q.931 Connect Acknowledge message to the switch. The switch then acknowledges the B channel connection established between it an the User PC by transmitting, as indicated by line 680, a Q.931 Connect Acknowledge message to the User PC. Now, with a functioning B channel circuit switched connection established between the User PC and the Broker PC, the User PC and Broker PC both initiate execution of the V.120 protocol and attempt initialization thereof in order to subsequently and accurately carry communication over this connection. Once this protocol is successfully initialized, the Broker PC transmits, as indicated by line 685, an Acknowledgement (ACK) message as an Ethernet LAN packet to the host computer, to signify that the B channel is successfully operating and can carry communication thereover. At this point, system 5 now resides in the B Channel Steady State state, as indicated by line 690.

FIG. 7 depicts a communication sequence that occurs among User Site 20 (that contains the User PC executing a terminal emulation program), ISDN switch 32, Broker PC 50 (containing its terminal adapter and LAN interface) and host system $70_1$ for invoking a session initiated disconnect in order to terminate a host session. A session initiated disconnect can arise while the host session is being carried over either a B or D channel connection. As such, an illustrative communication sequence that occurs to cause a disconnect for each of these two different connections will be separately discussed.

In particular, if the host session is presently being carried over a D channel packet switched connection, then system 5 exists in the D Channel Steady State state as indicated by line 703 in FIG. 7. Assume the user enters, as symbolized by line 705, a specific entry, e.g. "^D" followed by a carriage return, through the user keyboard at the User PC to instruct the host to terminate the host session. In response to this entry, the User PC transmits, as indicated by line 710, an X.25 packet that contains this entry over the D channel packet connection to the switch. The switch, in turn, as indicated by line 715, transmits a similar X.25 packet containing this entry over a D channel packet connection to the Broker PC. The Broker PC, in response to the receipt of this packet forms an Ethernet LAN packet containing this entry and transmits this LAN packet, as indicated by line 718, over the LAN connection to the host computer. In response to this packet, the host computer terminates the host session, formulates a TCP/IP disconnect message to disconnect the LAN connection and transmits this disconnect message, as indicated by line 720, as an Ethernet LAN packet to the Broker PC. In response to this disconnect message, the Broker PC and subsequently the switch tear down the D channel connection. Specifically, after the Broker PC receives the TCP/IP disconnect message from the host computer, the Broker PC transmits, as indicated by line 725, an X.25 Clear Request packet to the switch to disconnect the current D channel connection existing therebetween. Once the switch disconnects the D channel connection to the Broker PC, the switch then transmits, as indicated by line 730, an X.25 Clear Indication packet to the User PC to indicate that a D channel connection no longer exists from the User PC to the Broker PC and therethrough, via a LAN connection, to the host computer. In response to this packet, the User PC disconnects its D channel connection to the switch and subsequently returns to its Terminal Idle state, i.e. state 210 shown in FIGS. 2A and 2B.

Now, alternatively, if the host session is presently being carried over a B channel circuit switched connection, then system 5 exists in the B Channel Steady State state as indicated by line 733 in FIG. 7. Again assume the user enters, as symbolized by line 735, the appropriate entry, e.g. "^D" followed by a carriage return, through the user keyboard at the User PC to instruct the host to terminate the host session. In response to this entry, the User PC transmits, as indicated by line 740, a message that contains this entry as V.120 data over the B channel circuit switched connection to the switch. The switch, in turn, as indicated by line 745, transmits a similar message containing this entry over a B channel connection to the Broker PC. The Broker PC, in response to the receipt of this V.120 data forms an Ethernet LAN packet containing this entry and transmits this LAN packet, as indicated by line 750, over the LAN connection to the host computer. In response to this packet, the host computer the host session, formulates a TCP/IP disconnect message to disconnect the LAN connection and transmits this disconnect message, as indicated by line 755, as an Ethernet LAN packet to the Broker PC. The Broker PC formulates a Q.931 Disconnect message and transmits this message, as indicated by line 760, to the switch to initiate disconnection of the current B channel connection existing therebetween and through the switch to the User PC. The switch, in response to the disconnect message, formulates a similar Q.931 Disconnect message and transmits this message, as indicated by line 765, to the User PC in order to instruct the latter to initiate disconnection of the current B channel connection existing therebetween. In response to this disconnect message, the User PC ceases to transmit further data over the B channel, releases the B channel connection and to signify this transmits, as indicated by line 770, a Q.931 Release message to the ISDN switch. The switch transmits, as indicated by line 775, a Q.931 Release message to the Broker PC signifying that the switch is ceasing to transmit data over the B channel and is releasing this channel. Thereafter, the Broker PC transmits, as indicated by line 780, a Q.931. Release Complete message to the switch to specify to the switch that the Broker PC has now totally released (torn down) the B channel connection. The switch transmits, as indicated by line 785, a Q.931, Release Complete message to the User PC to specify to the User PC that the switch has now totally released the B channel connection. At this point, the B channel connection between the User PC and the Broker PC is completely torn down and all that remains to be done is to tear down the D channel connection existing between the Broker and User PCs. To accomplish this, shortly after the Broker PC has transmitted a Q.931 Release Complete message to the switch, the Broker PC transmits, as indicated by line 790, an X.25 Clear Request packet to the switch to disconnect the current D channel connection existing therebetween. Once the switch disconnects the D channel connection to the Broker PC, the switch then transmits, as indicated by line 795, an X.25 Clear Indication packet to the User PC to indicate that a D channel connection no longer exists through the User PC to the Broker PC and therethrough, via a LAN connection, to the host computer. In response to this packet, the User PC disconnects its D channel connection to the switch and subsequently returns to its Terminal Idle state, i.e. state 210 shown in FIGS. 2A and 2B.

With the above discussion now in mind, the architecture of our inventive system, e.g system 5 shown in FIG. 1, can be readily extended and generalized to a multi-broker approach. This approach utilizes a group of brokers, in which each broker can establish access into the ISDN and therethrough establish an ISDN connection to any other broker in the group. As such, a user situated at one broker, i.e. the "originating" broker, can establish an ISDN call, via the ISDN, such as through a basic ISDN 2"B"+"D" access path, to another broker, i.e. the "destination" broker, to establish a host session with a remote host computer situated at the latter broker. In this approach either of these two communicating brokers can dynamically change an ISDN access path that connects these brokers between a circuit switched connection and a packet switched connection according to the communication demands that occur during the host session. A block diagram of an embodiment, i.e. multi-broker system 800, that implements this approach is shown in FIG. 8.

In its simplest embodiment, system 800 as shown in FIG. 8 contains two brokers 820 and 840 that are both connected to ISDN 830 via ISDN access lines 825 and 835, respectively. Broker 820, also referred to as Broker A or the originating broker, executes user process 810, also referred to as user process A, which may be a terminal emulation program. For example, a user situated at a display screen and a keyboard associated with this broker merely invokes the emulation program to establish and thereafter conduct a host session with a remote host computer. Once the terminal emulation program is executing within originating broker 820 and the user enters a command thereat to initiate a host session, originating broker 820 then establishes an ISDN access path through ISDN 830 to another broker, i.e. destination broker 840, also referred to as Broker B. In response to the establishment of an ISDN D channel packet switched connection between these two brokers, the destination broker establishes a connection to a computer situated thereat to invoke user process 850, also referred to as user process B. User process 850 may illustratively be a "UNIX" host operating system, such as that described above. As such, system 5 shown in FIG. 1 is a specific implementation of system 800 shown in FIG. 8. Depending upon the specific computer situated at the originating and destination brokers, each broker may include a LAN connection, such as that described above, to the corresponding computer or a direct connection such as through a high speed parallel or serial port into the computer situated thereat and associated therewith. Clearly, with this approach several brokers (not shown) could be connected through separate or bridged ISDN connections to establish a network thereamong through which any one broker can bi-directionally communicate with several different remotely situated host computers to establish and conduct concurrent host sessions therewith in order to invoke and simultaneously process various different corresponding host applications. Nonetheless, each host session involves a single originating broker, i.e. that which originated the session, and a single destination broker, i.e. that broker which is associated with a given remote host computer. For purposes of simplifying the drawing and the ensuing discussion, only one host session will be assumed to occur between a single pair of brokers: originating broker 820 and destination broker 840, as shown, wherein either one of these brokers has the capability to dynamically change the ISDN access path used to carry that session between a B channel circuit switched connection and a D channel packet switched connection in the event that broker determines that a change has occurred in the communication requirements of that session or that broker has been specifically instructed to change the channel, through user process 810 for broker 820 or user process 850 for broker 840.

Figure 9B:
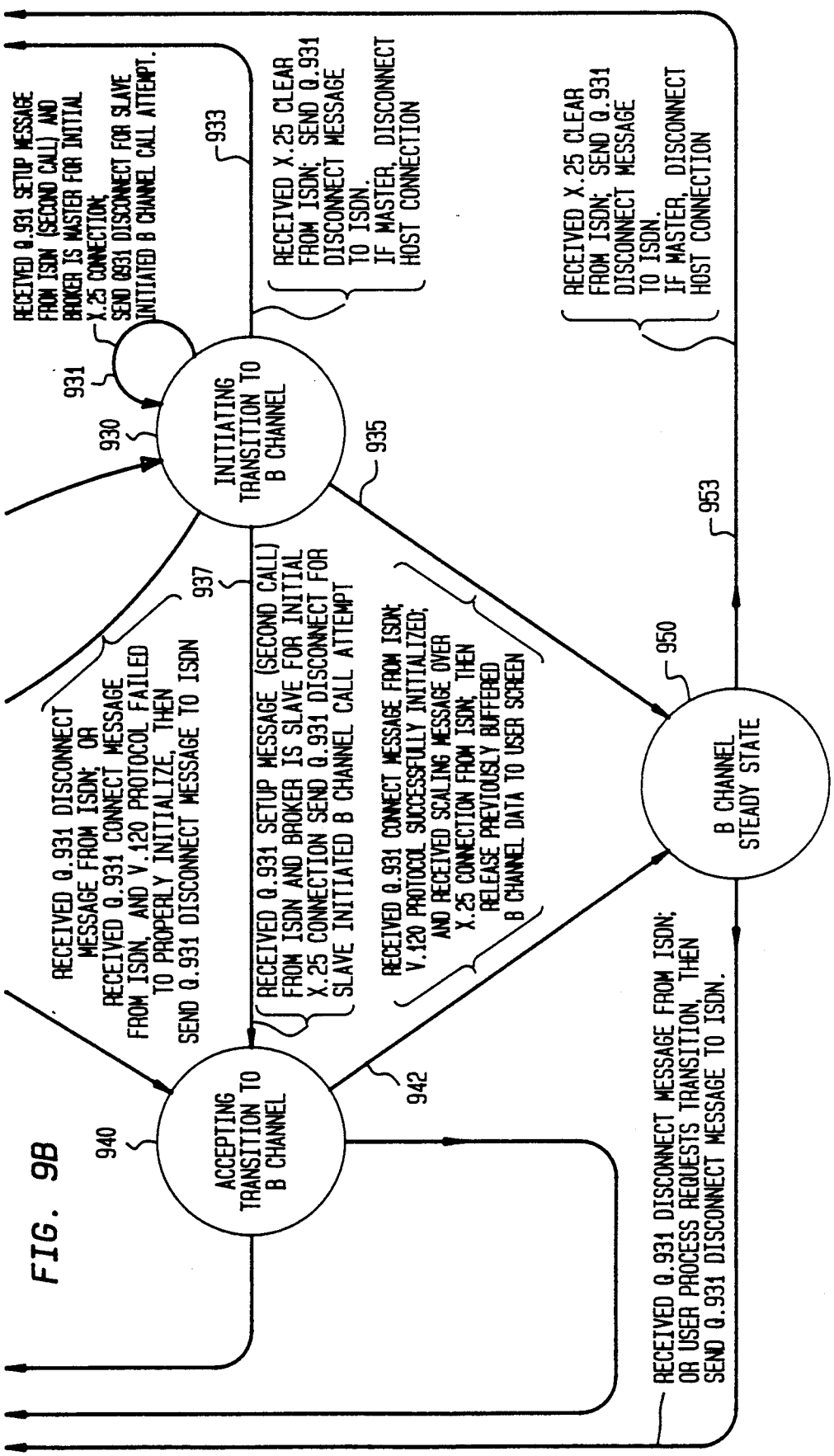

A state diagram of the software that is implemented within any broker, e.g. broker 820, that forms multibroker system 800 shown in FIG. 8 and used in conjunction with dynamically managing a single ISDN access path appearing therein is collectively depicted in FIGS. 9A and 9B; the proper alignment of the drawing sheets for these figures is shown in FIG. 9. Inasmuch as broker 840, shown in FIG. 8, is situated at an opposite end of the ISDN access path as is broker 820, broker 840 will be referred to as the "peer" broker throughout the following discussion. The procedure executed by broker 820 requires the establishment of a "master/slave" relationship between this broker and its peer broker in order to assure that only one circuit switched connection is established between these two brokers should both brokers attempt to transition simultaneously from a D channel to a B channel connection. When the initial X.25 connection is established between the two brokers, that broker which is the recipient of the connection is defined to be the master broker while the other broker which initiates the connection is defined to be the slave broker. This definition once established remains constant throughout the remainder of the ISDN connection established between the two brokers. The definition is only used, as set forth below, when the user processes occurring at both brokers are attempting to simultaneously establish B channel connections between both brokers and provides a mechanism to select which one of the two brokers is permitted to establish a B channel connection with the other broker. In particular, the B channel connection that the master broker is attempting to establish takes precedence over the B channel connection that the slave broker is simultaneously attempting to establish. As such, both brokers will continue Q.931 establishment procedures for B channel connection initiated by the master broker while aborting the D channel connection initiated by the slave broker.

As shown in FIGS. 9A and 9B, if broker 820 is not actively carrying a host session, then that broker remains in Idle state 910 until a D channel connection is to be established with the peer broker. To establish such a connection, a user invokes a terminal emulation program within broker 820 which subsequently, in turn, transmits an X.25 Call Request packet through the ISDN and specifies the peer broker as its destination. In the event that the ISDN is unable to connect the call, then the ISDN returns an X.25 Clear packet to broker 820 to terminate the call attempt. In this case, broker 820 remains, as indicated by line 913, in state 910. Alternatively, if broker 820 receives an X.25 Call Connect packet from the ISDN, thereby signifying that the call attempt was successful, and broker 820 through a user process executing thereat was the broker that initiated the call attempt, then broker 820 is defined as being the slave broker. If, on the other hand, the successful call attempt initiated with a user process executing at the peer broker, i.e broker 840, then broker 820 is defined as being the master broker. As noted above, each broker maintains this definition throughout the remainder of its ISDN connection with the other broker. Once broker 820 has defined its status as master or slave, the state of this broker transitions along line 917 into D Channel Steady State state 920.

While in the D Channel Steady State state, broker 820 and its peer broker accept and pass X.25 packets therebetween between user process 810 through the ISDN and user process 850 for processing. Broker 820 will leave state 920 under various conditions: an X.25 Clear message is received from the ISDN to disconnect the D channel connection; the user process, i.e. user process 810 shown in FIG. 8, executing at that broker requests a transition from a D to B channel connection and/or the user process executing at the peer broker, i.e. user process 850, requests a transition from a D to B channel connection. Specifically, if broker 820 receives an X.25 Clear packet from the ISDN to disconnect the D channel connection, then that broker, if it is a master, first disconnects any host connection it established to its associated computer followed by transitioning its state, as indicated by line 928, back into Idle state 910. Alternatively, if broker 820 receives a Q.931 Setup message from the ISDN and the originator of this message is not the peer broker, then this message is erroneous. In this case, broker 820 will send a corresponding Q.931 Disconnect message to the ISDN to terminate this attempted B channel connection and will thereafter remain, as indicated by line 922, in D Channel Steady State state 920. Now, in the event that broker 820 receives a Q.931 Setup message to establish a B channel connection to its peer broker, the state of this broker will transition into one of two transitory states, specifically Initiating Transition to B Channel state 930 or Accepting Transition to B Channel state 940, depending upon whether broker 820 initiated that Q.931 message or received it from its peer broker, broker 840.

In the event that broker 820 initiated the request to transition to a B channel connection, such as through a user request entered at this broker, the state of broker 820 then transitions along line 924 into Initiating Transition to B Channel state 930. State 930 is a transitory state and is essentially identical to B Channel Establishment state 230, discussed above in conjunction with FIGS. 2A and 2B, with the addition of two additional transition routes. Broker 820 will exist within state 930 for a very short period of time. While in this state, broker 820 will not transmit any data messages to the ISDN. However, broker 820 will accept any keyboard input from the user and locally buffer this data for subsequent transmission. If any X.25 packets are received from the ISDN, then broker 820 will locally display the data contained within these packets and appropriately process any PAD commands contained within these packets according to the X.3 and X.29 PAD Recommendations. Also, in the event any B channel data is received, broker 820 will appropriately buffer this data for subsequent display. Now, based upon whether broker 820 can successfully establish a B channel connection (as a "first" such connection) to the ISDN, or whether a second request for a B channel connection was received prior to the successful establishment of the first B channel connection and broker 820 is a master or slave broker, then broker 820 transitions into one of four states: D Channel Steady State state 920, Terminal Idle state 910, Accepting Transition to B Channel state 940 or B Channel Steady State state 950.

If broker 820 resides in state 930 and is attempting to establish a B channel connection with the ISDN but the ISDN is unable to provide this connection to broker 820, then this broker then receives a Q.931 Disconnect message from the ISDN. In response to this message, the state of broker 820 transitions along line 939 back into D Channel Steady State state 920 in order for this broker to carry subsequent communication as X.25 packet traffic to its peer broker over the existing D channel connection to the ISDN. Alternatively, if a B channel connection has been established between the ISDN and broker 820 but the V.120 protocol has then failed to properly initialize, then broker 820 issues a Q.931 Disconnect message to the ISDN to tear down this connection. Once this disconnect message is generated, the state of broker 820 also transitions along line 939 back to state 920.

Now, if broker 820 is in the process of establishing a B channel connection over the ISDN to its peer broker as part of state 930 and then receives a Q.931 Setup message from the peer broker, this message indicates that both brokers are now attempting to simultaneously initiate B channel call connections. To assure that only one B channel connection is established as the result of these two call attempts, only one of these attempts will be successful depending upon whether broker 820 has a master or slave status, as discussed above. In particular, the master/slave status of broker 820 determines which one of two states, state 940 or 950, this broker assumes. The master broker will be permitted to establish its B channel connection through the ISDN; while the connection which the slave broker is attempting to establish will be aborted.

Specifically, if broker 820 has the status as the master broker and is attempting to establish a B channel connection within state 930 and simultaneously receives a Q.931 Setup message from its peer broker, then, in response to this setup message, broker 820 will transmit a Q.931 Disconnect message to the ISDN instructing the network to disconnect the B channel connection which its peer, i.e. the slave broker, is attempting to establish. This disconnect message when executed by the ISDN effectively terminates the B channel call setup attempt then being undertaken by the peer broker and permits the ISDN to successfully establish the B channel connection which broker 820, as master broker, has initiated. In particular, once this disconnect message is transmitted, broker 820 remains, as indicated by line 931, in Initiating Transition to B Channel state 930. Thereafter, broker 820, as a master broker, proceeds to finish establishing its B channel connection through the ISDN to the peer broker. In so doing once broker 820 receives a Q.931 Connect message from the ISDN and obtains an indication that the V.120 protocol has properly initialized over this connection and has received a sealing message in an X.25 packet over the D channel connection, broker 820 will release any previously buffered data received over the B channel connection to the user screen associated therewith. Once this occurs, the state of broker 820 transitions along line 935 into B Channel Steady State state 950.

Alternatively, if broker 820 has the status as the slave broker and is attempting to establish a B channel connection within state 930 and simultaneously receives a Q.931 Setup message from its peer broker, then, in response to this setup message, broker 820 will transmit a Q.931 Disconnect message to the ISDN instructing the network to disconnect the B channel connection which broker 820, i.e. the slave broker, is attempting to establish in favor of permitting the ISDN to successfully establish a B channel connection which the peer broker, as master broker, has initiated. As such, broker 820 sends a Q.931 Disconnect message to the ISDN to terminate the B channel connection attempt it has initiated. Once this has occurred, the state of broker 820 transitions along line 937 into Accepting Transition to B Channel state 940. State 940 is also a transitory state and is essentially identical to B Channel Establishment state 230, discussed above in conjunction with FIGS. 2A and 2B. Within state 940, broker 820 will proceed to finish establishing a B channel connection with its peer, broker, here the master broker. In so doing once broker 820 receives a Q.931 Connect message from the ISDN and obtains an indication that the V.120 protocol has properly initialized over this connection and has received a sealing message in an X.25 packet over the D channel connection, broker 820 will release any previously buffered data received over the B channel connection to the user screen associated thereat. Once this occurs, the state of broker 820 transitions along line 942 into B Channel Steady State state 950. Alternatively, if broker 820 is unable to successfully establish a B channel connection with and initiated by its peer broker, then broker 820, depending upon the message it receives from the ISDN, transitions back into D Channel Steady State state 920 or Idle state 910. Specifically, if broker 820 receives a Q.931 Disconnect message, the state of broker 820 transitions along line 946 back into D Channel Steady State state 920 in order for broker 820 to carry subsequent communication as X.25 packet traffic to its peer broker over the existing D channel connection to the ISDN. Alternatively, if a B channel connection has been established between the ISDN and broker 820 but the V.120 protocol has then failed to properly initialize, then broker 820 issues a Q.931 Disconnect message to the ISDN to tear down this B channel connection. Once this disconnect message is generated, the state of broker 820 also transitions along line 946 back to state 920. Alternatively, if broker 820, while in state 940, receives an X.25 Clear packet from the ISDN, thereby indicating that the D channel packet connection should be torn down, broker 820 subsequently transmits a Q.931.Disconnect message to the ISDN to tear down the D channel connection. Once this occurs, the state of broker 820 transitions, along line 944, back to Idle state 910.

Now, if broker 820, while in state 930, receives an X.25 Clear packet from the ISDN, thereby indicating that the D channel packet connection should be torn down, broker 820, if it is a master, disconnects any connection it has established to its host computer for the peer broker and subsequently transmits a Q.931 Disconnect message to the ISDN to tear down the B channel connection. Once this occurs, the state of broker 820 transitions, along line 933, back to Idle state 910.

While in B Channel Steady State state 950, broker 820 accepts and passes data in V.120 form over the B channel circuit switched connection through the ISDN between itself and its peer broker for processing by the respective user processes executing thereat. In this state and aside from any protocol conversion that may occur, broker 820 merely passes data without altering its content. Broker 820 remains in state 950 until the ISDN disconnects the D channel connection, or the peer broker or the user process executing at broker 820 requests a transition in the current ISDN access path from a B to a D channel connection. In particular, if broker 820, while residing in B Channel Steady State state 950, receives a Q.931 Disconnect message from the ISDN over the D Channel connection, this indicates that the peer broker is requesting a transition from a B to a D channel connection. As such, the state of broker 820 transitions along line 957 back to D Channel Steady State state 920 in order for broker 820 to carry subsequent communication as X.25 packet traffic to its peer broker over the existing D channel connection to the ISDN. Alternatively, if a user process executing within broker 820 requests a B to D channel transition, then broker 820 transmits a Q.931 Disconnect message to the ISDN to tear down the current B channel connection. Once broker 820 receives a suitable Q.931 Release Complete message from the ISDN specifying that the B channel connection no longer exists, then the state of broker 820 also transitions along line 957 back to D Channel Steady State state 920. Lastly, if broker 820, while in state 950, receives an X.25 Clear packet from the ISDN, thereby indicating that the D channel packet connection should be torn down, broker 820, if it is a master, disconnects any connection it has established to its host computer for the peer broker and subsequently transmits a Q.931 Disconnect message to the ISDN to tear down the B channel connection. Once this occurs, the state of broker 820 transitions, along line 953, back to Idle state 910.

Clearly, those skilled in the art recognize that although inventive system 5, shown in FIG. 1, has been shown and described as inter-connecting a Broker PC to a number of separate host computers by a LAN, each of these host computers does not need to be situated in the vicinity of the Broker PC. In fact, the LAN can extend quite some distance to reach a host computer. For host computers that are dispersed over a relatively wide geographic area, the LAN could be advantageously replaced with a metropolitan area network (MAN) or with any one of various other types of well known high speed digital computer links that inter-connect these host computers with the Broker PC.

In addition, the inventive system could easily function with other forms of ISDN access, such as primary rate ISDN access, in which a multitude of B channel paths, e.g. 23 B channel paths, exist for every one D channel path. Through use of such forms of ISDN access, each broker would be able to support an increased number of User PCs than that described above. The functions performed by each User and Broker PC would be substantially identical to those described above.

Furthermore, the host computer could employ a suitable algorithm which statistically determines on a global basis, based upon illustratively queues of messages and packets awaiting transport through the ISDN, arrival rates of messages and packets at their destinations and/or ongoing distribution of traffic flow throughout the ISDN, whether a B or D channel ISDN connection should be used in a given situation. As such, this algorithm would utilize rules that advantageously make the selection of whether to use a B or D channel ISDN connection essentially independent of the current host application being executed by a user. If a terminal adapter and a network termination were to be connected directly to the host computer, then this host computer could be directly interfaced to a 2"B"+"D" basic access path in the ISDN network and, at the appropriate times, generate appropriate Q.931 control messages and X.25 packets to dynamically change a current ISDN connection which a remote user is employing during a host session. Inasmuch as the ISDN interface functions provided by the broker would, through such use of a terminal adapter, be incorporated into the host computer, this would advantageously and substantially eliminate the need to use a separate broker with that host computer. In addition, the broker or merely its functionality could be readily incorporated into the ISDN itself, and preferably within an ISDN switch, in order to permit an entity that is communicating over an ISDN access path provided by the switch and which is connected to an end of that path to dynamically manage that path in accordance with the communication requirements of a task currently being executed at either end of that path during a host session involving that entity.

Moreover, although the user has been described as being an individual that merely executes a terminal emulation program at a User PC in system 5 shown in FIG. 1 or a broker in system 800 shown in FIG. 8, the user need not be so constrained. In fact, the user can be another computer that provides a requisite amount of remote data processing during the host session, with the amount being dependent upon the processing capability at the user location and its availability thereat. Such host sessions that bifurcate processing responsibilities between two separate computers interconnected through a transmission media, such as an ISDN connection, can frequently arise in distributed processing applications. One such illustrative application involves a computer integrated manufacturing (CIM) system that integrates and permits data transfer between several geographically dispersed computerized systems; e.g. a computer aided designing (CAD) and/or a computer aided engineering (CAE) system situated at an engineering location, a computer aided manufacturing (CAM) and/or a computerized inventory system situated at a plant location, and/or various computer assisted accounting, scheduling and/or management systems situated at a headquarters location.

Although various embodiments of the present invention have been shown and described in detail herein, many other varied embodiments that incorporate the teachings of the present invention may be easily constructed by those skilled in the art.

We claim:

1. Apparatus for dynamically changing an access path having a plurality of different communication performance attributes between a first connection having one set of said attributes and a second connection having a different set of said attributes during an ongoing host session carried over said access path in order to provide the particular one of said first and second connections that is most suited to the current communication needs of said session, said apparatus comprising:

means for connection to one end of said access path and to a host computer for instructing a communication system that provides said access path to change a connection provided over said access path between said first and second connections in response to a command received from the host computer during execution of said host session, said instructing means comprising:

means for establishing an interface to the host computer to begin said host session and for maintaining the interface substantially throughout the remainder of the host session; and means, responsive to said interface and for connection to said one end of the access path, for receiving a command over said interface from said host computer requesting a change in the connection provided over the access path between said first and second connections and for supplying the command over said access path in a pre-defined form as an instruction to said communication system so as to effectuate said requested change.

2. The apparatus in claim 1 wherein said instructing means further comprises means, responsive to communication containing a message to establish a host session and received over said access path and originating at an opposite end thereof, for instructing said interface establishing and maintaining means to establish said interface to the host computer and initiate said session.

3. The apparatus in claim 2 wherein said communication system is an ISDN network having at least one ISDN switch and said access path is an ISDN access path, wherein said first connection is an ISDN circuit switched B channel connection and said second connection is an ISDN D channel packet switched connection.

4. The apparatus in claim 3 wherein the D channel packet switched connection is maintained throughout the duration of said host session and the B channel circuit switched connection is established or torn down in accordance with the command issued by the host computer requesting a change in the connection provided over the ISDN access path.

5. The apparatus in claim 4 wherein said B channel carries V.120 data messages and said D channel carries both X.25 data and control packets and Q.931 messages and wherein the instruction to said ISDN network is in the form of a pre-defined Q.931 message.

6. The apparatus in claim 5 wherein said instructing means further comprises means, responsive to V.120 data messages, Q.931 messages and X.25 data packets received over said access path and communication received over said interface from the host computer, for converting protocols therebetween so as to permit the host computer to bi-directionally communicate over said ISDN access path to a user situated at the opposite end of said path and to instruct said ISDN network to effectuate the requested change.

7. The apparatus in claim 4 wherein the host computer issues the command in response to a corresponding call statement embedded within and encountered by the host computer during execution of a host application program, a result of a table look-up operation undertaken by the host computer given a name of a current host application program that is to be currently executed by the host computer, or whenever the host computer detects that the host application program currently executing has terminated line buffering and local echo functions.

8. The apparatus in claim 4 wherein said instructing means further comprises an ISDN network termination for providing a physical ISDN link to said command receiving means from a corresponding ISDN access line provided by the ISDN network.

9. The apparatus in claim 8 wherein the ISDN access path is a basic ISDN access path containing two B channels and one D channel.

10. A method for dynamically changing an access path having a plurality of different communication performance attributes between a first connection having one set of said attributes and a second connection having a different set of said attributes during an ongoing host session carried over said access path in order to provide the particular one of said first and second connections that is most suited to the current communication needs of said session comprising the steps of:

instructing a communication system that provides said access path to change a connection provided over said access path between said first and second connections in response to a command received from the host computer during execution of said host session, said instructing step comprising:

establishing an interface to the host computer to begin said host session;

maintaining the interface substantially throughout the remainder of the host session;

receiving a command over said interface from said host computer requesting a change in the connection provided over the access path between said first and second connections; and supplying the command over said access path in a pre-defined form as an instruction to said communication system so as to effectuate said requested change.

11. The method in claim 10 wherein said instructing step further comprises the step of instructing, in response to communication containing a message to establish a host session and received over said access path and originating at an opposite end thereof, said interface establishing and maintaining means to establish said interface to the host computer and initiate said session.

12. The method in claim 11 wherein said communication system is an ISDN network having at least one ISDN switch and said access path is an ISDN access path, wherein said first connection is an ISDN circuit switched B channel connection and said second connection is an ISDN D channel packet switched connection.

13. The method in claim 12 wherein the instructing step further comprises the steps of:
- maintaining the D channel packet switched connection throughout the duration of said host session; and
- establishing or tearing down the B channel circuit switched connection in accordance with the command issued by the host computer requesting a change in the connection provided over the ISDN access path.

14. The method in claim 13 wherein said B channel carries V.120 data messages and said D channel carries both X.25 data and control packets and Q.931 messages and wherein the instruction to said ISDN network is in the form of a pre-defined Q.931 message.

15. The method in claim 14 wherein said instructing step further comprises the step of converting, in response to V.120 data messages, Q.931 messages and X.25 data packets received over said access path and communication received over said interface from the host computer, protocols therebetween so as to permit the host computer to bi-directionally communicate over said ISDN access path to a user situated at the opposite end of said path and to instruct said ISDN network to effectuate the requested change.

16. The method in claim 13 wherein the host computer issues the command in response to a corresponding call statement embedded within and encountered by the host computer during execution of a host application program, a result of a table look-up operation undertaken by the host computer given a name of a current host application program that is to be currently executed by the host computer, or whenever the host computer detects that the host application program currently executing has terminated line buffering and local echo functions.

* * * * *